Oct. 12, 1954  G. A. UNGAR  2,691,482
METHOD AND APPARATUS FOR COMPRESSING AND EXPANDING GASES
Original Filed April 23, 1946  16 Sheets-Sheet 1

INVENTOR
GUSTAVE A. UNGAR, DECEASED, BY
IRMA UNGAR, ADMINISTRATRIX

BY   Mock & Blum
ATTORNEYS

Oct. 12, 1954  G. A. UNGAR  2,691,482
METHOD AND APPARATUS FOR COMPRESSING AND EXPANDING GASES
Original Filed April 23, 1946  16 Sheets-Sheet 2

INVENTOR
GUSTAVE A. UNGAR, DECEASED
By IRMA UNGAR, ADMINISTRATRIX
By Mock & Blum
ATTORNEYS Oct. 12, 1954    G. A. UNGAR    2,691,482
METHOD AND APPARATUS FOR COMPRESSING AND EXPANDING GASES
Original Filed April 23, 1946    16 Sheets-Sheet 3

INVENTOR
GUSTAVE A. UNGAR, DECEASED By
IRMA UNGAR, ADMINISTRATRIX
By    *Mock v. Blum*
ATTORNEYS Oct. 12, 1954    G. A. UNGAR    2,691,482
METHOD AND APPARATUS FOR COMPRESSING AND EXPANDING GASES
Original Filed April 23, 1946    16 Sheets-Sheet 5

INVENTOR
GUSTAVE A. UNGAR, DECEASED BY
IRMA UNGAR, ADMINISTRATRIX

By   Mock v Blum
ATTORNEYS

Oct. 12, 1954  G. A. UNGAR  2,691,482
METHOD AND APPARATUS FOR COMPRESSING AND EXPANDING GASES
Original Filed April 23, 1946  16 Sheets-Sheet 6

INVENTOR
GUSTAVE A. UNGAR, DECEASED BY
IRMA UNGAR, ADMINISTRATRIX
By  Moeke & Blum
ATTORNEYS Oct. 12, 1954          G. A. UNGAR          2,691,482
METHOD AND APPARATUS FOR COMPRESSING AND EXPANDING GASES
Original Filed April 23, 1946          16 Sheets-Sheet 8

INVENTOR
GUSTAVE A. UNGAR, DECEASED BY
IRMA UNGAR, ADMINISTRATRIX

By *Mock + Blum*
ATTORNEYS

Oct. 12, 1954   G. A. UNGAR   2,691,482
METHOD AND APPARATUS FOR COMPRESSING AND EXPANDING GASES
Original Filed April 23, 1946   16 Sheets-Sheet 11

INVENTOR
GUSTAVE A. UNGAR, DECEASED BY
IRMA UNGAR, ADMINISTRATRIX

By   Mock & Blum
ATTORNEYS

Oct. 12, 1954 G. A. UNGAR 2,691,482
METHOD AND APPARATUS FOR COMPRESSING AND EXPANDING GASES
Original Filed April 23, 1946 16 Sheets-Sheet 12

INVENTOR
GUSTAVE A. UNGAR, DECEASED BY
IRMA UNGAR, ADMINISTRATRIX
By *Mock & Blum*
ATTORNEYS Oct. 12, 1954    G. A. UNGAR    2,691,482
METHOD AND APPARATUS FOR COMPRESSING AND EXPANDING GASES
Original Filed April 23, 1946    16 Sheets-Sheet 13

INVENTOR
GUSTAVE A UNGAR, DECEASED BY
IRMA UNGAR, ADMINISTRATRIX

By  Mock & Blum
ATTORNEYS

Oct. 12, 1954    G. A. UNGAR    2,691,482
METHOD AND APPARATUS FOR COMPRESSING AND EXPANDING GASES
Original Filed April 23, 1946    16 Sheets-Sheet 16

INVENTOR.
GUSTAVE A. UNGAR, DECEASED BY
IRMA UNGAR, ADMINISTRATRIX
BY Mock & Blum
ATTORNEYS

Patented Oct. 12, 1954

2,691,482

UNITED STATES PATENT OFFICE

2,691,482

METHOD AND APPARATUS FOR COMPRESSING AND EXPANDING GASES

Gustave A. Ungar, deceased, late of New Rochelle, N. Y., by Irma Ungar, administratrix, New Rochelle, N. Y., assignor to Equi-Flow, Inc., New York, N. Y., a corporation of Delaware Substituted for abandoned application Serial No. 664,255, April 23, 1946. This application July 17, 1952, Serial No. 299,766

18 Claims. (Cl. 230—138)

This invention relates to a new and improved method and apparatus for producing the polytropic and non-polytropic compression and the polytropic and non-polytropic expansion of a gas or mixture of gases. The invention relates particularly to polytropic compression and expansion.

This application is a substitute for abandoned application Ser. No. 664,255, filed April 23, 1946, by Gustave A. Ungar.

According to this method, rotary compressors can be used, which may be of any positive-displacement type.

Such rotary compressors are well-known, but they are suitable only for low compression ratios, because of their low thermal efficiency at high compression ratios.

For example, in the lobe or Root type of rotary compressor, which includes gear pumps, the gas is drawn in at an inlet pressure into the apparatus, in successive pockets. Each pocket is delivered to the outlet of the apparatus, which is connected to a storage tank, at the initial inlet pressure of the gas. As each pocket thus communicates with the storage tank at the outlet end of the compressor, there is a rush of gas or air from the tank into the respective communicating pocket of the compressor, because the pressure in said tank is higher than the initial inlet pressure. The entry of the compressed air of the tank into the respective communicating pocket results, in effect, in an increase of pressure of the gas in the pocket, at constant volume.

It has been attempted to diminish this undesirable effect in compressors of the Root type and vane type, by providing means for reducing the volume of the drawn-in gas volume, before establishing full communication between the respective pocket of the compressor and the storage tank. Such known design requires a considerable reduction in the size of the discharge port between the compressor and the storage tank, unless a low compression ratio is used. This reduction in port size produces wire drawing or throttling losses.

In such known design, the best compression ratio has been 3.5 to 1. A higher compression ratio resulted in excessive wire-drawing or throttling losses, due to greatly reduced area of the discharge port of the compressor. According to this invention, a compression ratio of 5 to 1 can be secured, and even higher, with high efficiency, and with the elimination of said losses.

In using a rotary compressor of the conventional vane type, a somewhat higher compression ratio can be secured than in the Root type. However, reduced discharge port area in the vane-type compressor also produces throttling losses. Likewise, a high compression ratio produces mechanical difficulties, because the vanes slide under heavy loads in the rotor slots. It is also necessary to provide pressure unloading devices before the pressure in the storage tank approaches the desired maximum pressure. Otherwise, there is a possibility of vane fracture, due to excessive overload.

Another disadvantage of each existing type of positive-displacement rotary compressor, is that each said compressor is designed to produce a fixed and selected compression ratio, and it is designed to deliver a fixed and selected end-pressure. If the same compressor is used for producing a different end-pressure than the selected end-pressure, there is a loss of efficiency unless the outlet port of the compressor is modified.

According to one embodiment of this invention, each charge of gas is compressed in a compression space or chamber which is provided intermediate or between a set of primary rotors and a succeeding set of secondary rotors. Both sets of rotors are continuously driven, and the compression is secured because the input displacement of the set of primary rotors is more than the delivery or output displacement of the set of secondary rotors. A polytropic compression can thus be secured in said intermediate compression chamber. In this embodiment, the apparatus delivers pockets of the gas, at its final pressure and temperature, to the secondary set of rotors, which then deliver the compressed gas to the storage tank, without any change of pressure or temperature in said secondary rotors. The final pressure which is produced in the intermediate compression space or chamber, may be the selected maximum pressure which it is desired to produce in the storage tank. Wire-drawing or throttling losses are thus eliminated, because an outlet port of ample size for the compressor can be used, and because the compressed air is discharged from the outlet of the secondary rotor in a substantially continuous and uniform stream with constant pressure.

An intermediate compression space or chamber can also be provided, whose minimum selected volume can be regulated, either manually or automatically, during the operation of the device. If the minimum volume of the compression chamber remains fixed, such apparatus operates with maximum efficiency if it is working against a fixed outlet pressure. However, if the compressed gas is forced into a storage tank, the pressure in such tank is gradually increased from an initial pressure to a selected maximum. In using a compressor whose intermediate compression space has a fixed volume, it is necessary always to create a final pressure in said compression space, which exceeds the selected maximum pressure in the storage tank. This results in low efficiency while the tank pressure is substantially below the outlet pressure of the compressor.

The minimum volume of the intermediate compression space is therefore regulated, so that said minimum volume is decreased as the pressure in the tank is increased. The delivery pressure of the compressor is therefore maintained at a selected value above the transient pressure in the storage tank. The drive of the valve rotors by the compressed gas in the intermediate compression chamber is thus minimized.

Numerous additional objects and advantages of this invention are set forth in the annexed description and drawings, which illustrate preferred embodiments thereof.

The first embodiment is illustrated in Figs. 1 and 2, which utilizes the lobe or Root type of rotor, with external lobes.

Figs. 3–6 inclusive illustrate the second embodiment, which utilizes the vane type of rotor.

Figure 4:
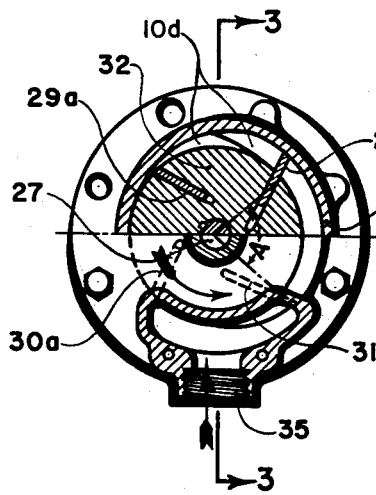
Figure 3:
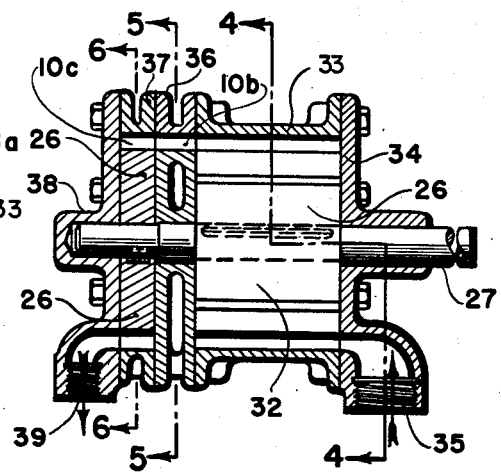

Fig. 3 is a section on the line 3—3 of Fig. 4.

Fig. 4 is a vertical section on the line 4—4 of Fig. 3.

Figure 5:
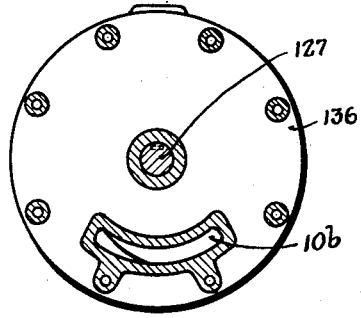
Figure 6:
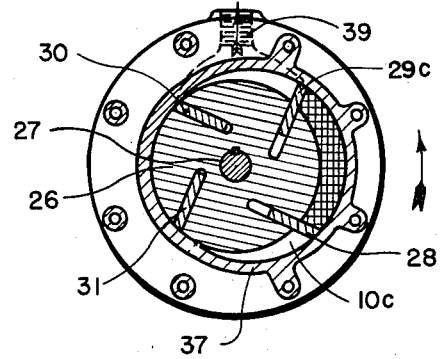

Figs. 5 and 6 are respective sections on the lines 5—5 and 6—6 of Fig. 3.

Figure 9:
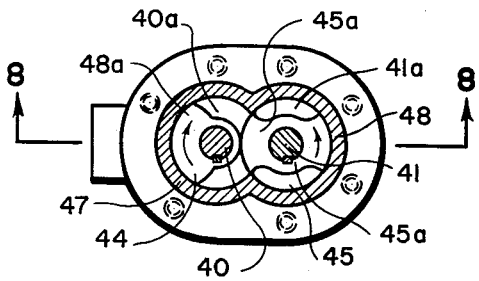
Figure 7:
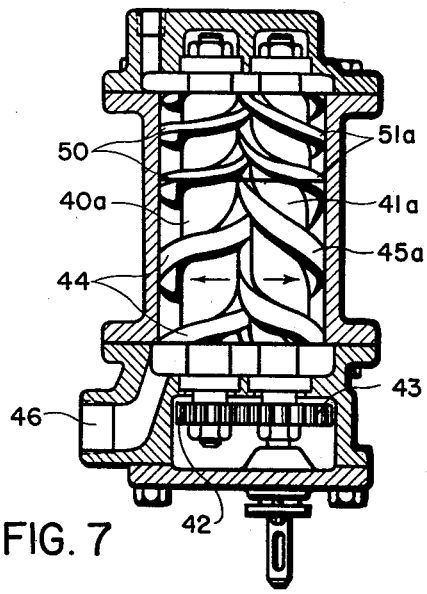
Figure 8:
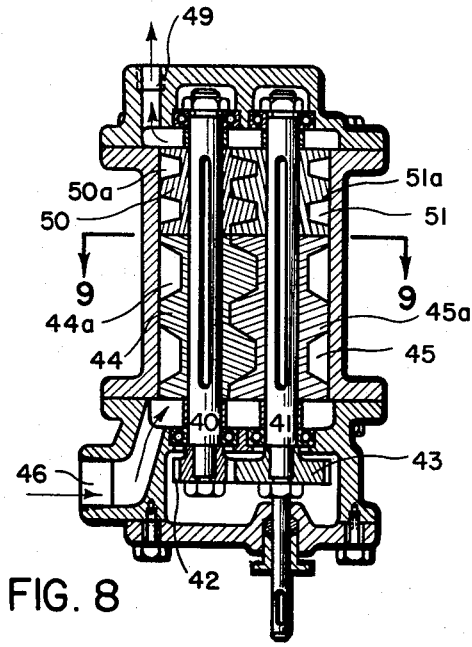

Figs. 7–9 inclusive illustrate the third embodiment, which utilizes a helical type of rotor, in which the intermediate space or chamber is of zero volume.

Fig. 7 is a vertical section, partially in elevation, showing the helical rotors.

Fig. 8 is a section on the line 8—8 of Fig. 9.

Fig. 9 is a section on the line 9—9 of Fig. 8.

Figure 10:
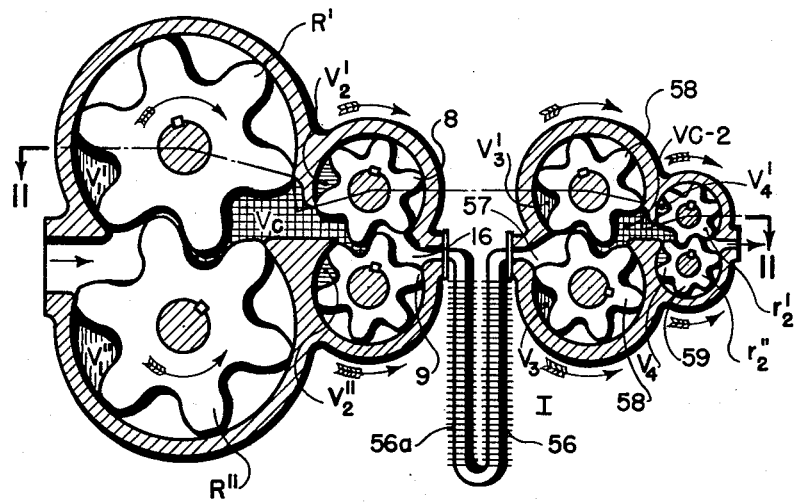
Figure 11:
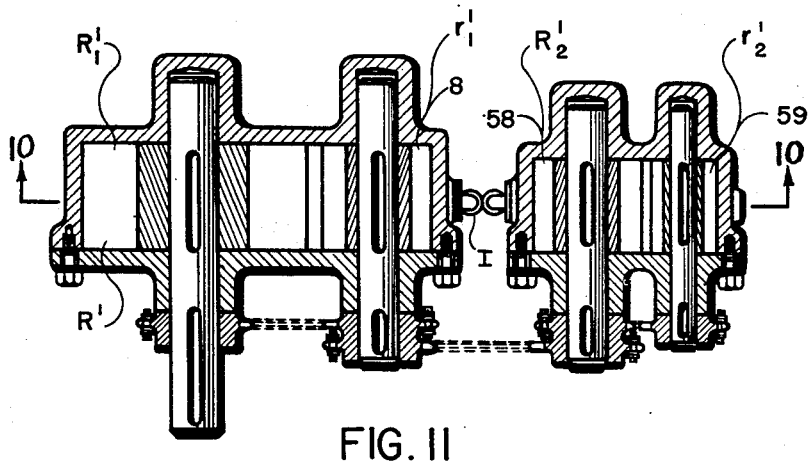

Figs. 10 and 11 illustrate the fourth embodiment which is a multiple stage compressor.

Fig. 10 is a section on the line 10—10 of Fig. 11.

Fig. 11 is a section on the line 11—11 of Fig. 10.

Figs. 12–19 illustrate the fifth embodiment, which illustrates the regulation of the minimum volume of the intermediate space or compression chamber. The compressor uses the lobe or Root type of rotor.

Figure 13:
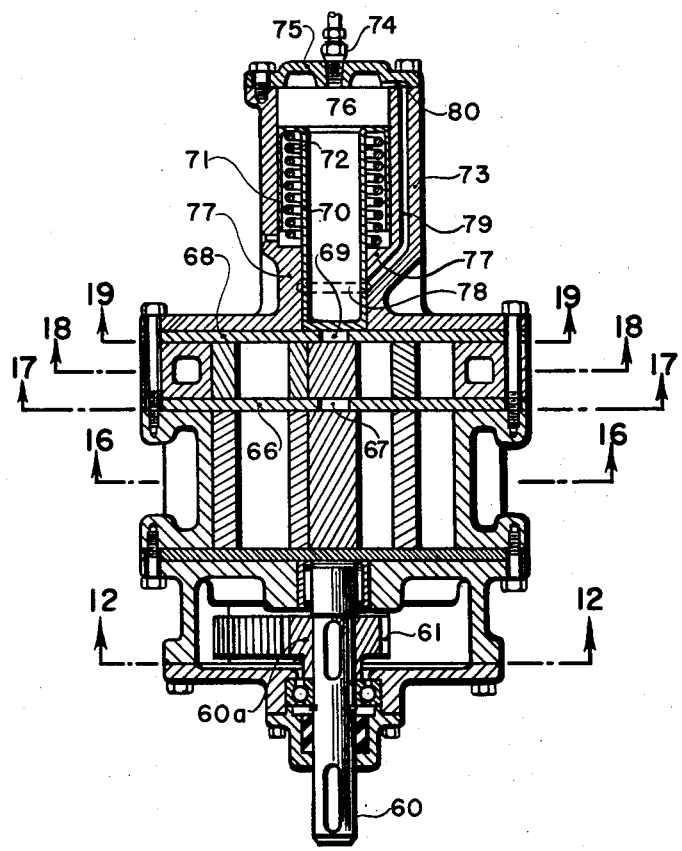
Figure 12:
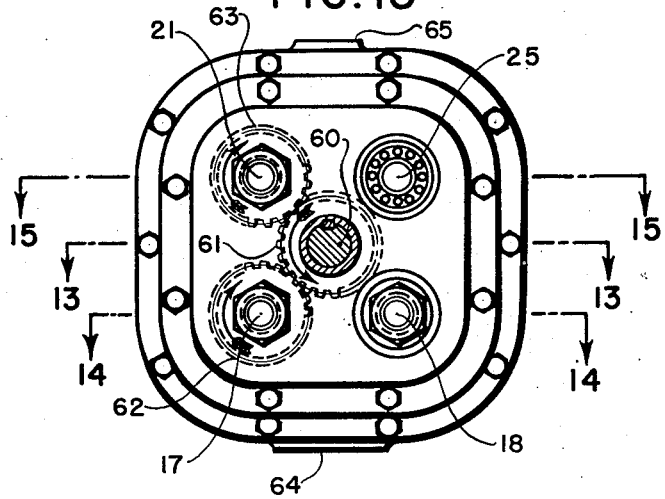

Fig. 12 is a section on the line 12—12 of Fig. 13.

Figure 19:
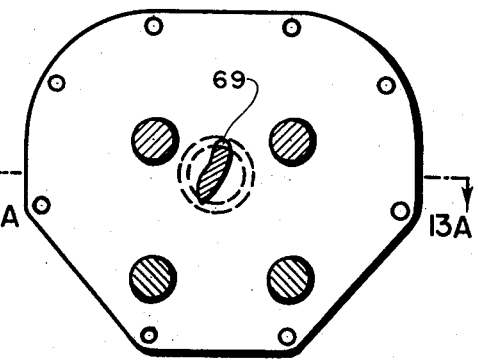

Fig. 13, in its lower part, is a section on the line 13—13 of Figs. 12, 16, 17, 18; and in its upper part, beginning with the section line 19—19, is a section on 13A—13A of Fig. 19.

Figure 14:
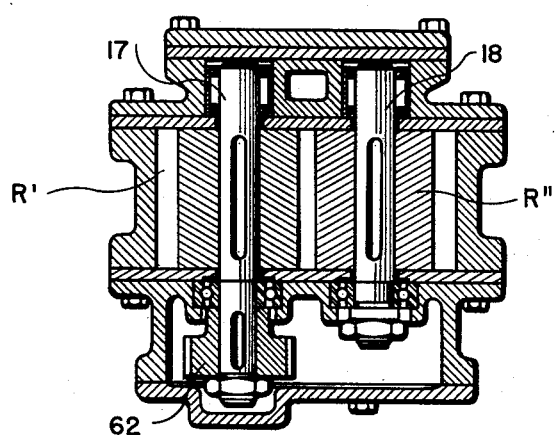

Fig. 14 is a section on the line 14—14 of Fig. 12.

Figure 15:
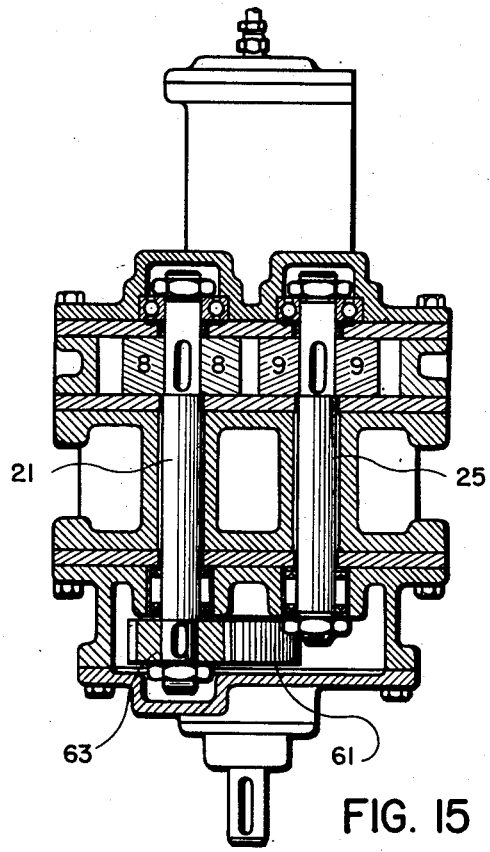

Fig. 15 is a section on the line 15—15 of Fig. 12.

Figure 16:
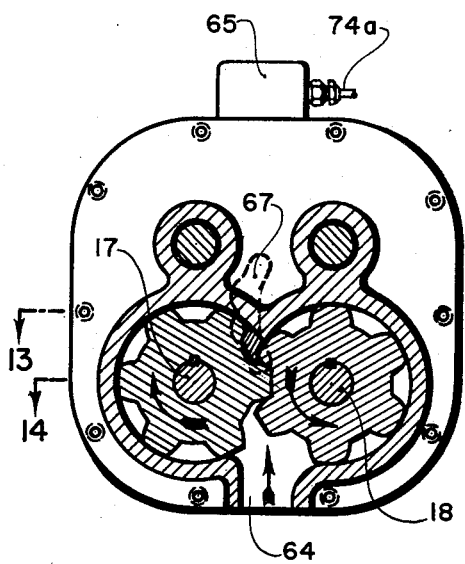

Fig. 16 is a section on the line 16—16 of Fig. 13.

Figure 17:
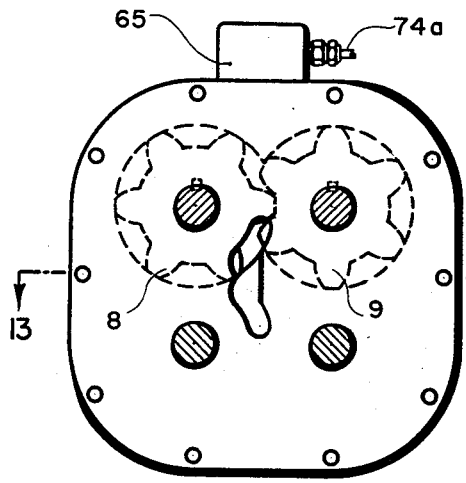

Fig. 17 is a section on the line 17—17 of Fig. 13.

Figure 18:
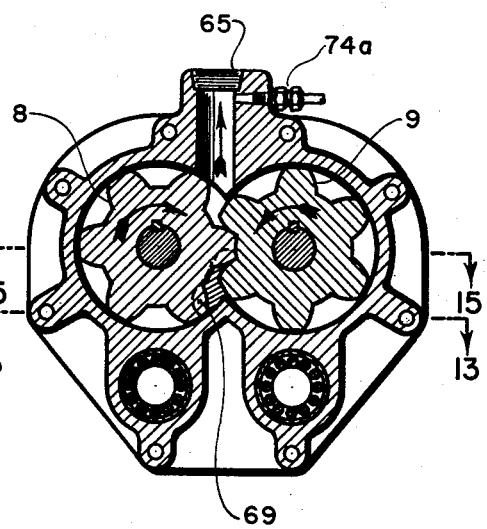

Fig. 18 is a section on the line 18—18 of Fig. 13.

Fig. 19 is a section on the line 19—19 of Fig. 13.

Figure 21:
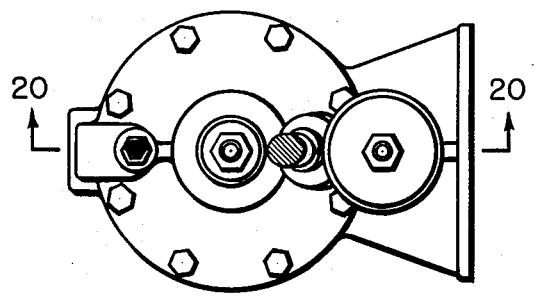
Figure 20:
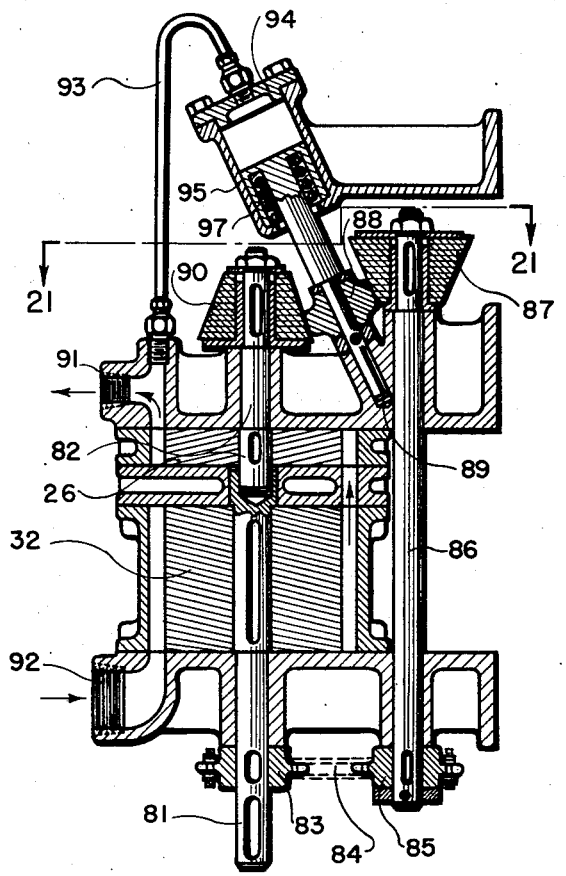

Figs. 20 and 21 illustrate the sixth embodiment in which the vane type of rotor is used, and the volume of the intemediate compression chamber is regulated by the pressure in the storage tank.

Fig. 20 is a section on the line 20—20 of Fig. 21.

Fig. 21 is a section on the line 21—21 of Fig. 20.

Figure 22A:
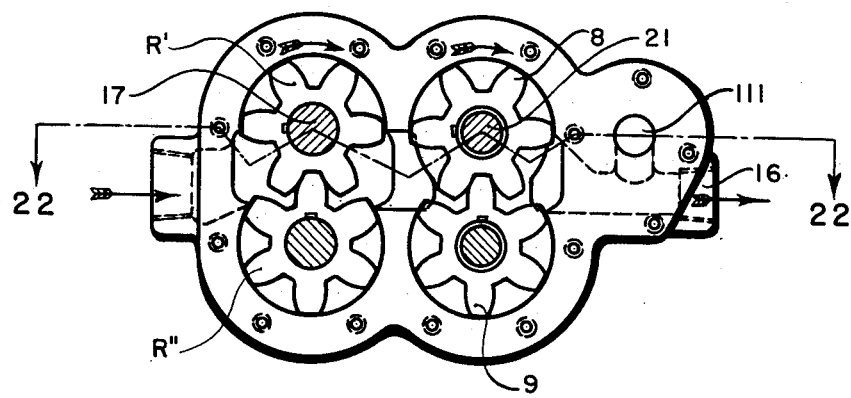
Figure 22:
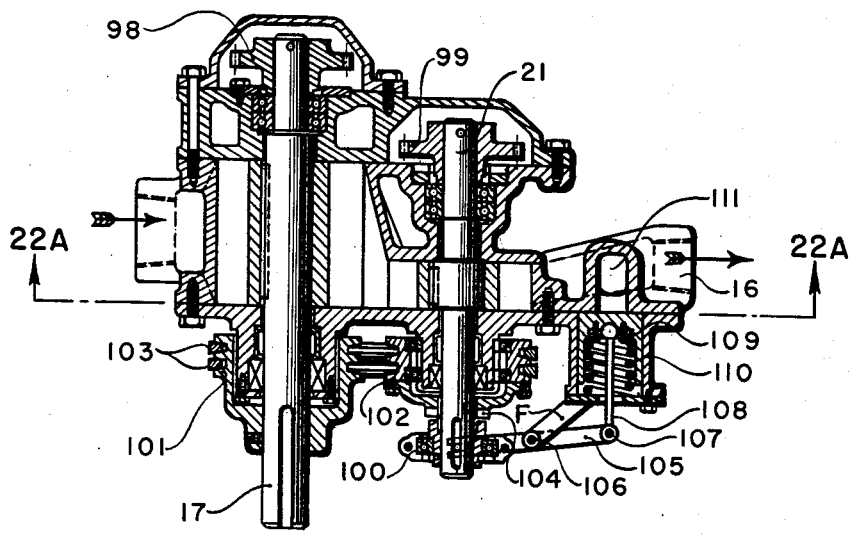
Figure 23:
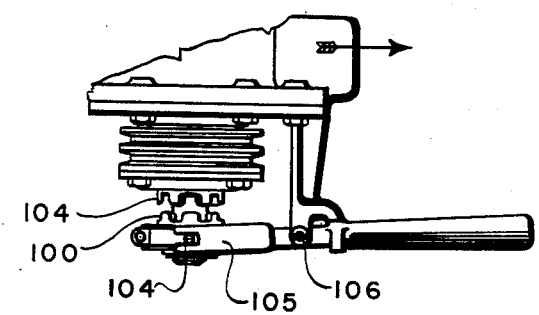

Figs. 22, 22A and 23 illustrate the seventh embodiment, in which the primary and secondary rotors can be coupled and uncoupled, by a mechanical or other clutch or coupling means, which may be of any type.

Fig. 22 is a section on the line 22—22 of Fig. 22A, which illustrates the automatic coupling of the primary and secondary rotors. This is regulated by the pressure in the storage tank.

Fig. 22A is a section on the line 22A—22A of Fig. 22.

Fig. 23 illustrates a device for manually coupling and uncoupling the primary and secondary rotors.

Figs. 24–31 illustrate the eighth embodiment, which illustrates a reversible motor made according to this invention, so that the power shaft of the motor can be driven in either of two opposed directions. In this embodiment, the use of lobe-type rotors is illustrated.

Figure 24:
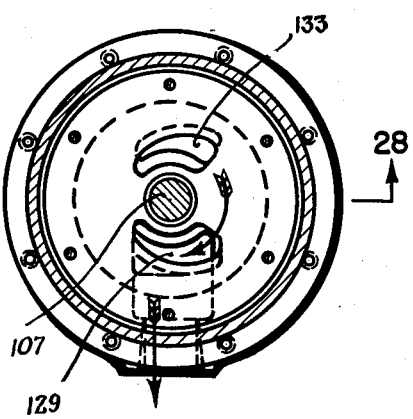
Figure 28:
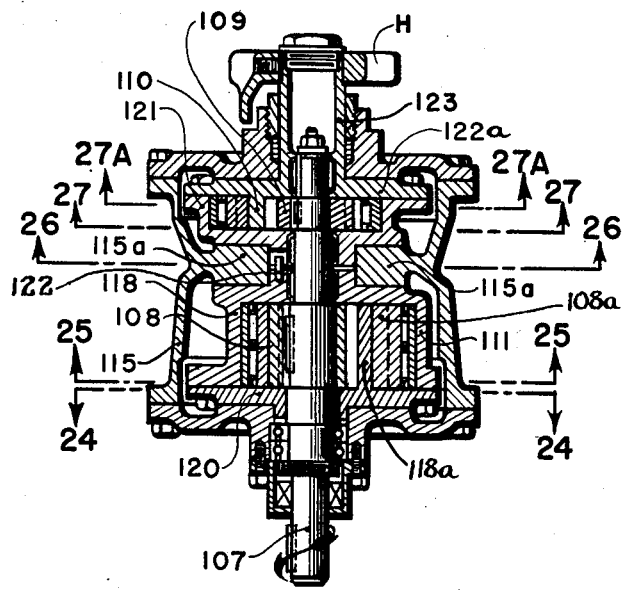

Fig. 24 is a section on the line 24—24 of Fig. 28.

Figure 25:
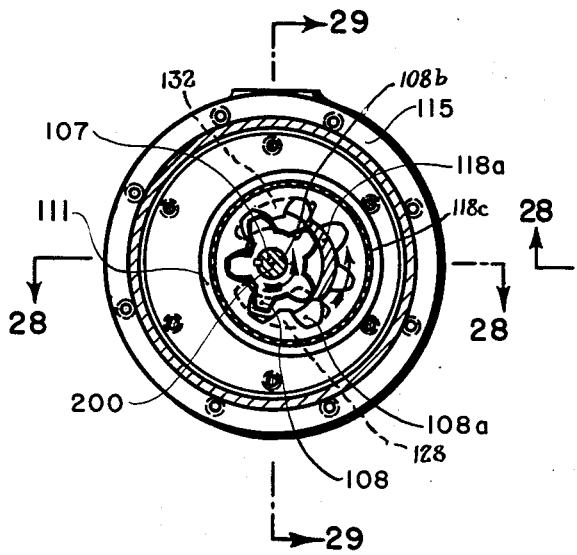

Fig. 25 is a section on the line 25—25 of Fig. 28.

Figure 26:
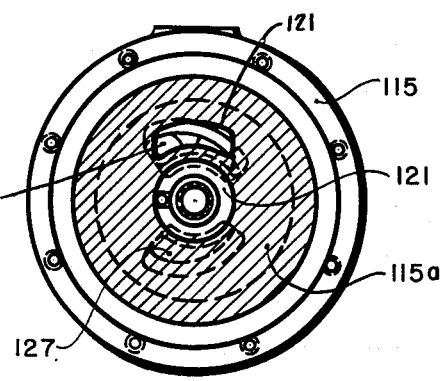

Fig. 26 is a section on the line 26—26 of Fig. 28.

Figure 27:
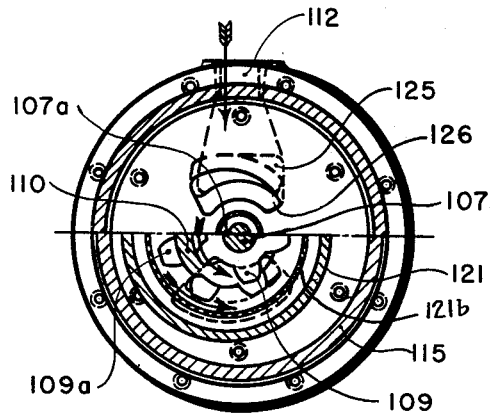

Fig. 27, in its upper part is a section on 27A—27A of Fig. 28, and in its lower part, it is a section on 27—27 of Fig. 28.

Fig. 28 is a section on the line 28—28 of Fig. 24, and it is also a section on the line 28—28 of Figs. 25, 30, and Fig. 31–31B.

Figure 29:
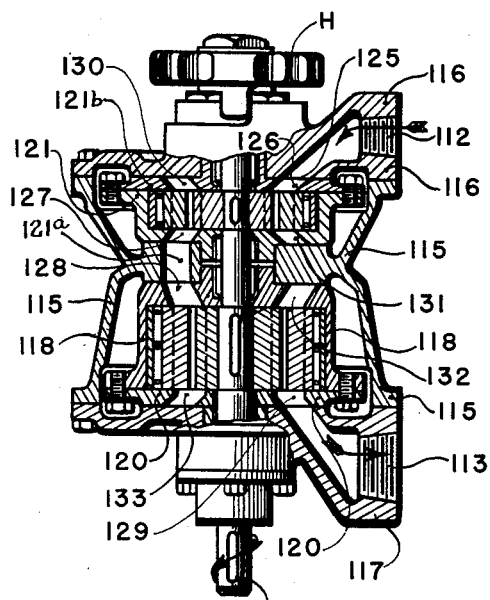

Fig. 29 is a section on the line 29—29 of Fig. 25.

Figure 30:
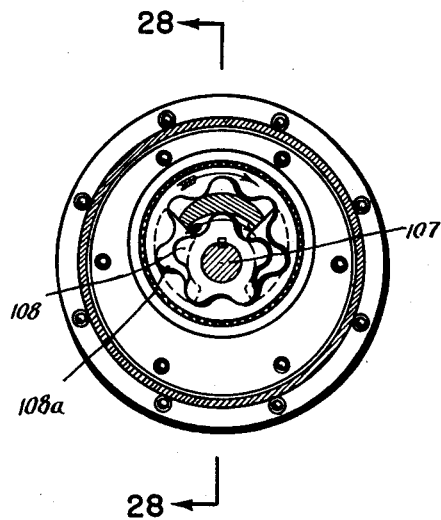
Figures 31, 31B:
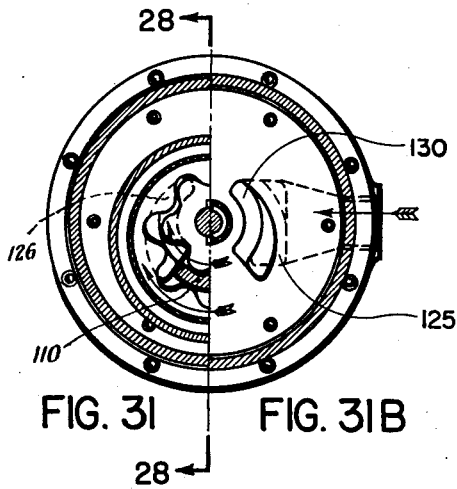

Figs. 30, 31–31B illustrate the positions of the inner housings of this eighth embodiment, when the motor shaft turns reversely to the direction of Figs. 24–29. Fig. 30 corresponds to Fig. 25.

Figure 31A:
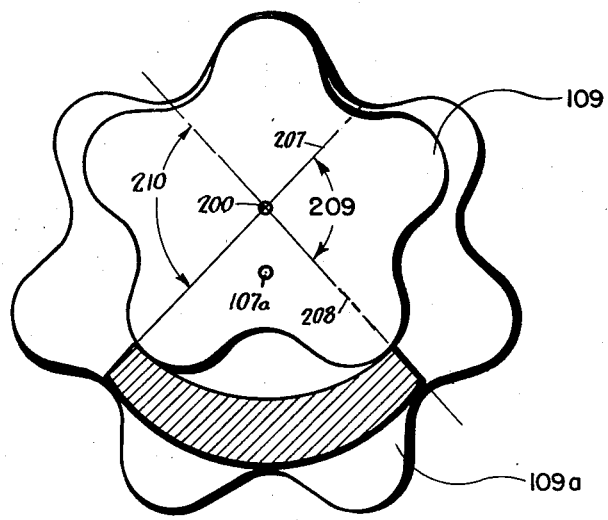

Fig. 31A is a detail of the rotors of this eighth embodiment.

The ninth embodiment is illustrated in Figs. 32–38, which shows means for varying the compression volume in a vane-type compressor, which can also be used reversely as a motor.

Figure 32:
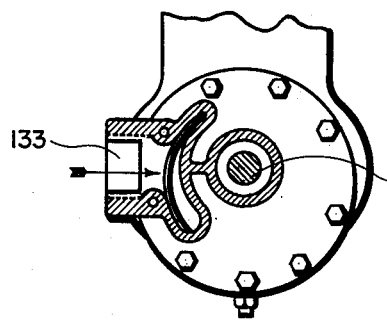
Figure 37:
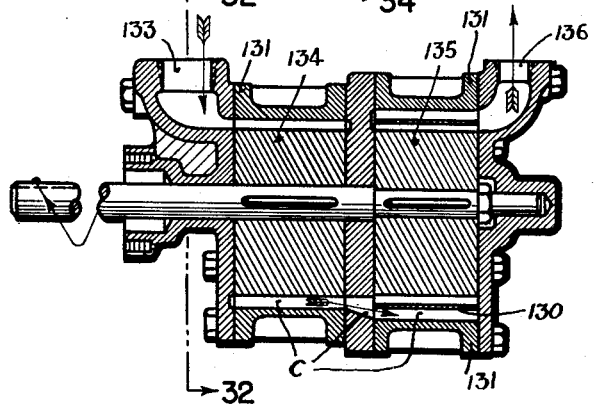

Fig. 32 is a section on the line 32—32 of Fig. 37.

Figure 33:
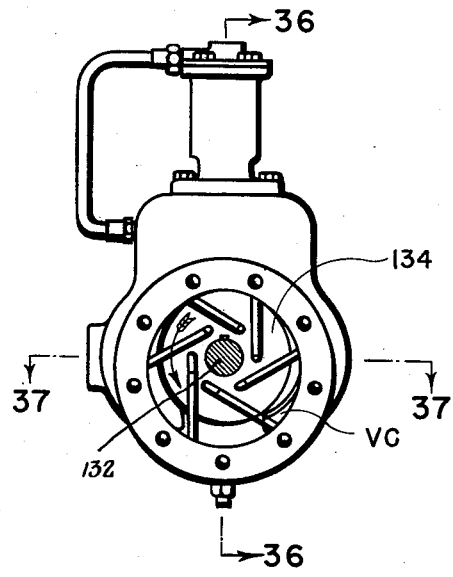
Figure 34:
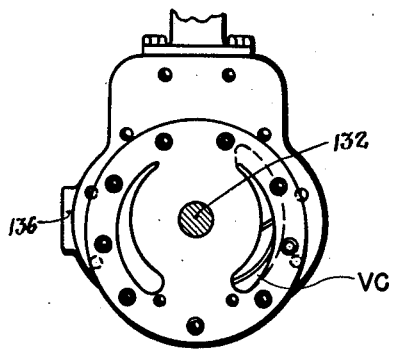
Figure 35:
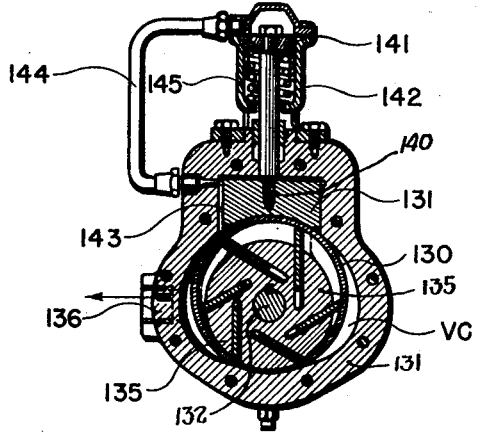
Figure 36:
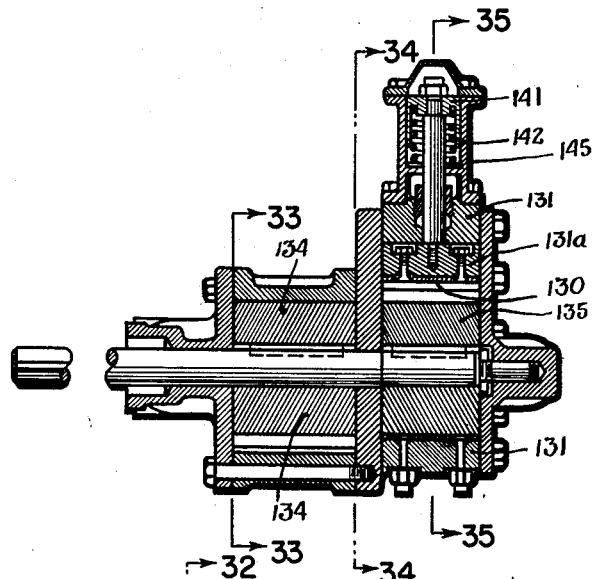

Figs. 33, 34, 35 are respective sections on the respective lines 33—33, 34—34, 35—35 of Fig. 36.

Fig. 36 is a section on the line 36—36 of Fig. 33.

Fig. 37 is a horizontal median section of Fig. 33.

Figure 38:
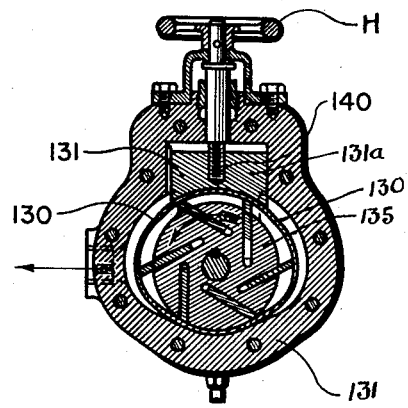

Fig. 38 illustrates a manual control for regulating the compression volume, hereinafter designated as $V_2$.

Figure 39:
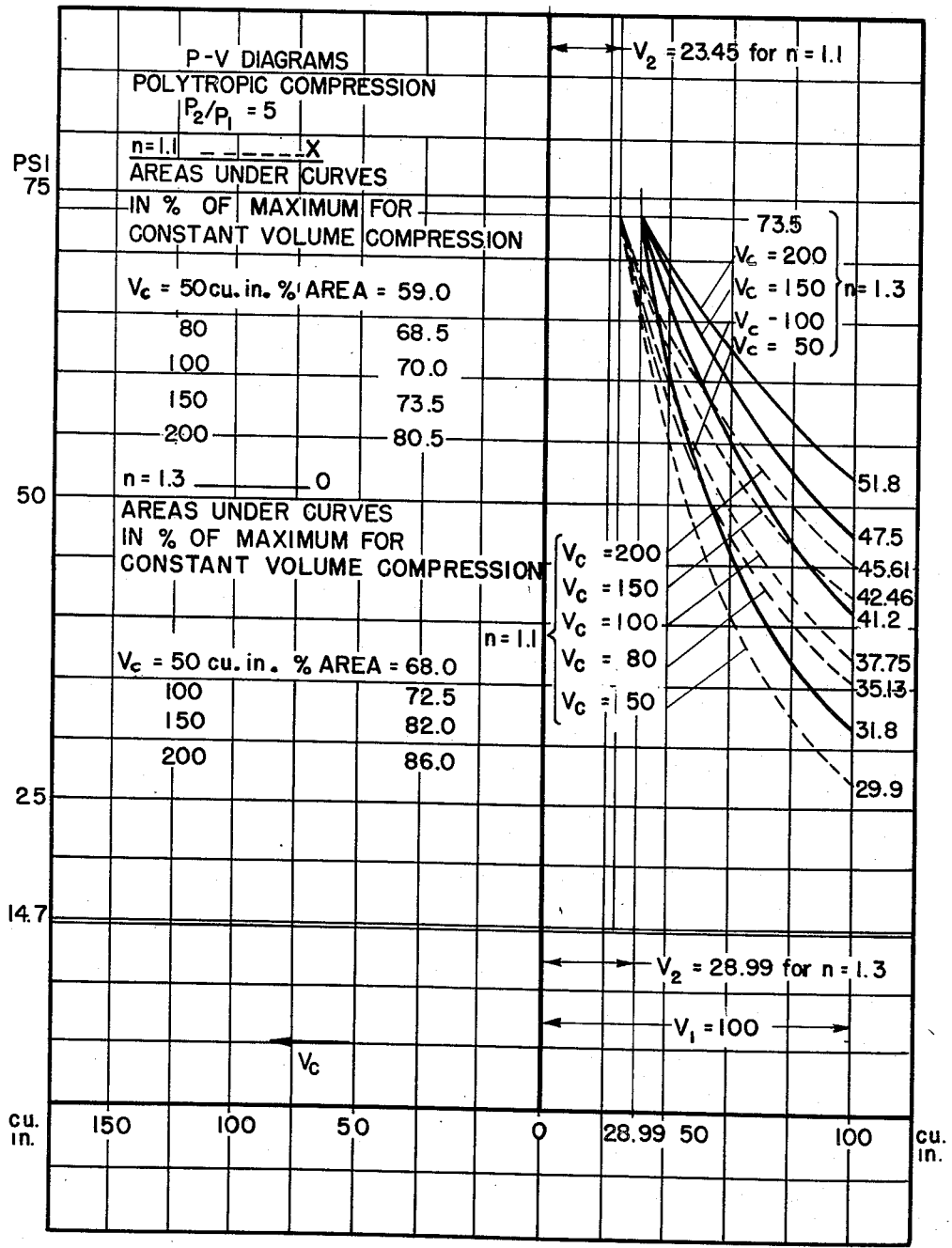
Figure 40:
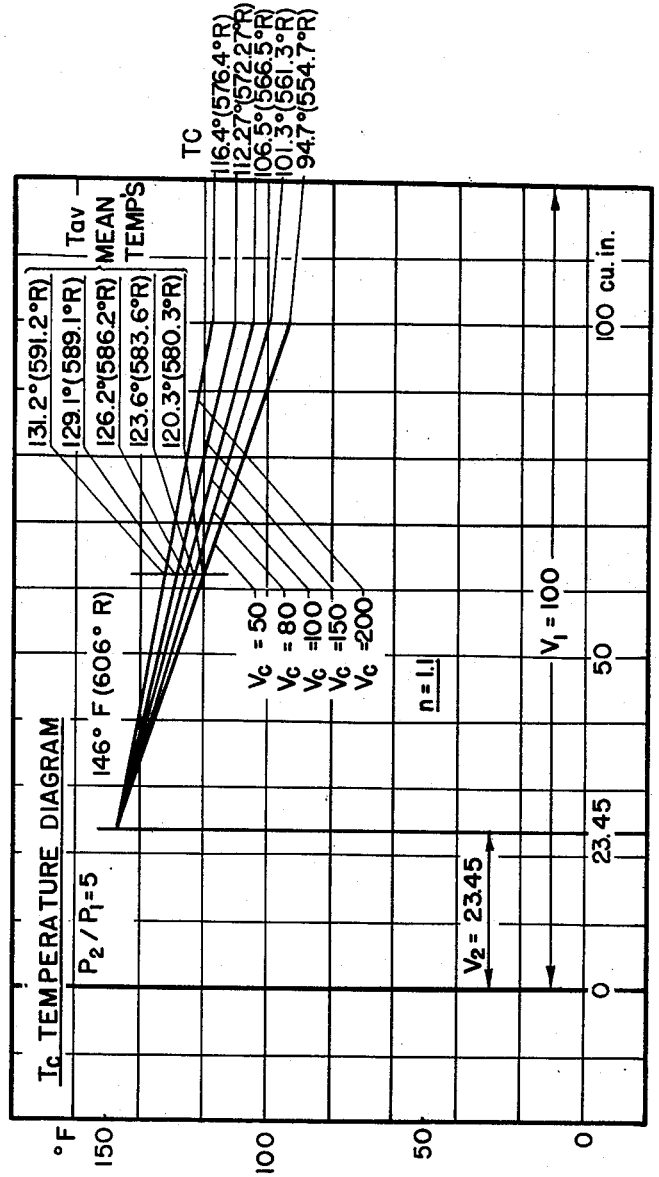
Figure 41:
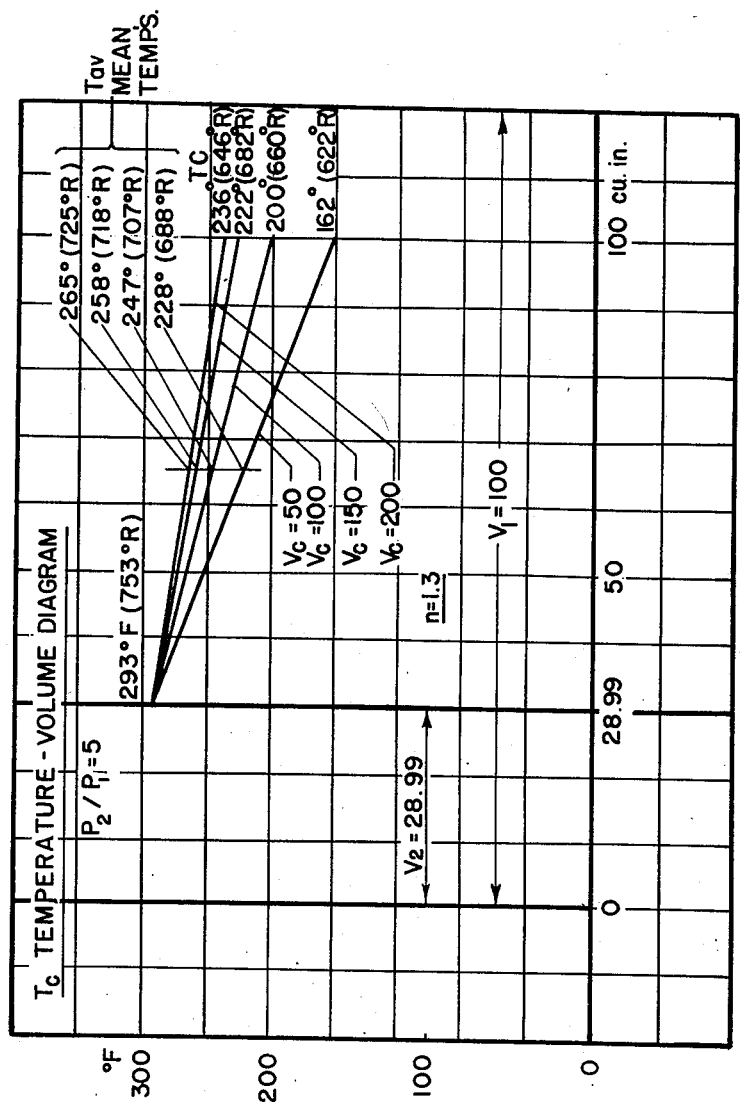

Figs. 39, 40 and 41 illustrate a number of graphs which explain the principle of the invention.

Each type of compressor apparatus made according to this invention, can be used reversely as a motor.

*First embodiment*

Figs. 1 and 2

This is a single-stage compressor system. It comprises primary rotors R' and R'', and secondary rotors 8 and 9. The two primary rotors R' and R'' are identical with each other. The two secondary rotors 8 and 9 are also identical with each other. These rotors, R', R'', 8, 9, are respectively detachably keyed or otherwise detachably fixed to respective parallel shafts 17, 18, 21, 25. As an example, primary rotor R' and secondary rotor 8 are turned clockwise, and primary rotor R'' and secondary rotor 9 are turned counterclockwise.

These rotors are of the lobe type or gear type.

The lobes of each set of rotors intermesh, optionally with zero clearance. It is within the scope of the invention to use rotors which are driven through timing gears and whose lobes have small clearance, thus eliminating metal-to-metal contact between the lobes of the intermeshing rotors. If such clearances are used it is unnecessary to provide internal lubrication for the rotors. These rotors operate without timing gears when there is zero clearance. However, it is desirable for some purposes, to use zero clearance with the necessary internal lubrication of the rotors, in order to reduce volumetric losses which result from even small clearances. Such volumetric losses make it necessary to rotate the rotors at very high anguluar velocity, in order to deliver a substantially continuous and uniform output of compressed air or gas. Such uniform and continuous output is desirable. Any known means can be used, in order to secure internal lubrication.

In this embodiment, the four rotors have the same number of lobes, and they are of the same width, as measured in the direction of the parallel axes of rotation of the respective shafts 17, 18, 21, and 25. In this embodiment, the four rotors are rotated in unison at the same angular velocity, so that each said rotor is turned through the same number of revolutions per minute.

The pitch diameter of the secondary rotors 8 and 9, is less than the pitch diameter of the primary rotors R' and R''.

These rotors are located respectively in a primary housing H and in a secondary housing 7, which are integral.

Primary housing H for the primary rotors R' and R'' has an inlet passage 2. Secondary housing 7 for the secondary rotors 8, 9 has an outlet 16.

The housings H and 7 have a common cover 19, which is fixed gas-tight to said housings by bolts 20. The usual packing can be used, in order to produce a gas-tight connection between cover 19 and said housings H, 7.

Respective and equal sprockets 22 and 23 are respectively fixed to shaft 17 of primary rotor R', and to shaft 21 of secondary rotor 8.

These equal sprockets 22 and 23 are fixed to parts of shafts 17 aond 21, which extend axially beyond cover 19. These shafts 17 and 21 are turned in the same direction.

Chain 24 connects sprockets 22 and 23. Primary rotor R'' is driven by primary rotor R', and secondary rotor 9 is driven by secondary rotor 8.

Each of the housings H and 7 has respective portions which have internal walls of cylindrical shape.

At these respective cylindrical portions, the lobes of the primary rotors R' and R'' form respective sealed primary pockets 4 and 3, and the lobes of the secondary rotors 8 and 9 form respective sealed secondary pockets 11 and 12.

Each primary pocket 4 and 3 is filled with gas at the inlet port 2, at the inlet pressure $P_1$ of the gas. Each pocket 4 and 3 conveys a respective gas-pocket at pressure $P_1$ to the intermediate space or chamber 10, through which the gas is transferred to the secondary rotors 8 and 9.

The gas which is delivered from the space or chamber 10 to the secondary pockets 11 and 12, is at the maximum pressure $P_2$ which is produced in the apparatus, so that chamber 10 is a compression chamber.

Each cycle of operation of the apparatus is performed, while the rotors turn through equal respective angles, which are defined by the respective and angularly equal arcs 6, 5, 14, 15.

The gas or air is compressed in the intermediate space 10, in each of said series of consecutive cycles. Each volume $V_2$ of compressed gas which is produced in each cycle at pressure $P_2$ is delivered at volume $V_2$ and pressure $P_2$ to a respective pair of secondary pockets, which deliver the same at volume $V_2$ and pressure $P_2$ to outlet 16. Said outlet 16 may be connected to the inlet of a storage tank. Said tank may be maintained sealed, save at its connection to outlet 16, so that the pressure in the tank is progressively increased to a selected maximum. If desired, the tank may have an outlet which is opened by a regulating valve while compressed gas is supplied to the tank, so that the pressure in the tank is maintained at a constant selected pressure, after the pressure in the tank has been increased to said selected value. Outlet 16 may be connected to an atomizer or other apparatus which directly utilizes the current of compressed gas which flows through outlet 16.

The rotors are preferably rotated at high velocity. Hence, although the apperatus delivers consecutive volumes $V_2$ of compressed gas at pressure $P_2$ to outlet 16, a substantially uniform current of gas, flowing at substantially uniform velocity, can be supplied to outlet 16.

Figure 1:
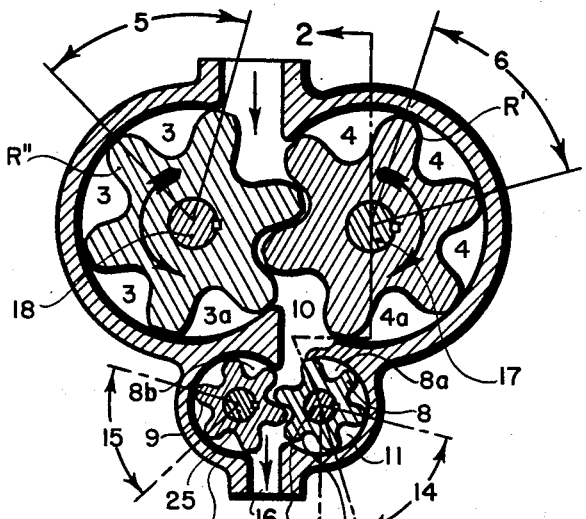
Fig. 1 is a vertical section on the line 1—1 of Fig. 2.

Fig. 1 shows the respective positions of the four rotors, at the end of a respective cycle. At this stage, the volume of the intermediate space 10 is of minimum volume $Vc$, and the air or gas in said intermediate space 10 is at the maximum pressure $P_2$. This is the end-compression stage of the respective cycle.

At this end-compression stage, the respective primary pockets 4 and 3, which are located at the stations $4a$ and $3a$, and which are directly adjacent the intermediate space 10, are sealed from said intermediate space 10 and from the other pockets 4 and 3 and from the inlet 2. At this end-compression stage, the respective secondary pockets 11 and 12 at the respective stations $8a$ and $8b$, which are directly adjacent the intermediate space 10, are also sealed from said intermediate space 10 and from the other pockets 11 and 12 and from the outlet 16.

At this end-compression stage, the secondary pockets 11 and 12 which are directly adjacent the outlet 16 in Fig. 1 are sealed from said outlet 16. In the preferred embodiment, and as previously stated, there is a substantially continuous and uniform flow of gas through the outlet 16, in the direction of the arrow in Fig. 1. Said outlet 16 may be connected to an outlet pipe of any desired length, whose internal diameter may be equal to the diameter of outlet 16, whose internal wall may be cylindrical. The diameter of said outlet pipe may bear any relation to the internal diameter of outlet 16. The cross-section of outlet 16 may remain fixed, and the cross-section of the connection or connections which succeed outlet 16 may remain fixed.

During each cycle, the primary rotors R' and R'' force into said intermediate space 10, a volume $V_1$ of gas at inlet pressure $P_1$, and said volume $V_1$ is equal to twice the volume of a primary pocket 4 or 3. The compressed gas volume $V_2$ which is discharged into outlet 16 at pressure $P_2$ during each cycle, equals twice the volume of a secondary pocket 11 and 12. The inlet pressure $P_1$ may be external atmospheric pressure.

Assume that the rotors are rotated through a small angle in advance of their respective end-compression positions of Fig. 1, in the directions of the respective arrows.

Intermediate space 10 will then communicate with the two adjacent primary pockets 4 and 3, which are turned through said small angle towards said intermediate space 10. The minimum volume $Vc$ of intermediate space 10 which is shown in Fig. 1, will be thus increased to $Vc$ plus $V_1$. This will result in a sharp drop in pressure in the intermediate space 10, because the compressed air or gas therein which is at the maximum pressure $P_2$ at minimum volume $Vc$ in Fig. 1, will be intermixed with the two volumes of gas, namely, volume $V_1$, of the adjacent pockets 4 and 3 at the stations 4a and 3a, to produce a mixture pressure $Pc$. The secondary pockets at the stations 8a and 8b will remain sealed from said intermediate space 10 when the rotors are turned through said small angle, because said secondary pockets 11 and 12 are turned away from said space 10. The secondary pockets 11 and 12 which are adjacent the outlet 16 in Fig. 1, will discharge their respective volumes of air or gas when the rotors are turned through said small angle, at the maximum pressure $P_2$ which is produced in space 10, into the outlet 16. The volume of compressed gas which is thus discharged is volume $V_2$.

After this mixing step which occurs at the beginning of each cycle, together with a simultaneous discharge of a volume $V_2$ of compressed gas at pressure $P_2$ at the outlet 16, the air or gas in space 10 is compressed to the maximum pressure $P_2$ by the further rotation of the rotors during the respective cycle, and the secondary pockets 11 and 12 at stations 8a and 8b are sealed from the space 10, just at the end of the respective cycle, which is the end-compression stage. Hence each sealed secondary pocket receives and retains a charge or volume of air at the maximum pressure $P_2$, until the respective volume $V_2$ is discharged at pressure $P_2$ into the outlet 16.

Fig. 39 shows two sets of graphs respectively in full and broken lines, which illustrate the advantage of using an intermediate space 10 which has lowest minimum volume $Vc$, at the end-compression stage of Fig. 1.

In each set of graphs, the abscissa denotes volume in cubic inches, and the ordinate indicates pressure in pounds per square inch.

In the ideal isothermal cycle which it is preferred to approach as closely as possible in compressing a gas, $n$ equals 1. In the broken-line set of graphs, $n$ equals 1.1, and $n$ equals 1.3 in the full-line set. The symbol $n$ is the exponent in the well-known equation for the polytropic change of state of perfect gases, namely, $pv^n$=constant.

$Vc$ is the minimum volume in cubic inches of the intermediate space 10, as shown in Fig. 1 at the end of the compression stage. This is the minimum value of the volume of said intermediate space 10. The broken-line graphs in Fig. 39 correspond to respective values of $Vc$, of 50, 80, 100, 150, 200 cubic inches. The bottom broken line graph corresponds to a value of $Vc$ of 50 cubic inches.

The four full-line graphs in Fig. 39 correspond to respective values of $Vc$, of 50, 100, 150, 200 cubic inches.

In each set of graphs, $V_1$, which represents twice the volume of a primary pocket 4 or 3, equals 100 cubic inches. This is the inlet volume at inlet pressure $P_1$, which may be normal atmospheric pressure or of any value.

$V_2$ represents twice the volume of a secondary pocket 11 or 12. In the broken-line set of graphs, $V_2$ equals 23.45 cubic inches. In the full-line set of graphs, $V_2$ equals 28.99 cubic inches. These are the respective outlet volumes at pressure $P_2$ which are delivered to the outlet. The graphs of Figs. 40 and 41 show the effect of increasing mean temperature with increasing $Vc$, for $n$ equaling 1.1 and 1.3 respectively. It is clear that an increase in mean temperature should be avoided, for highest efficiency.

The economy in power consumption increases as $Vc$ is diminished.

If the pressure in the storage tank T exceeds $P_1$, and assuming that the air or gas is passed through the apparatus and said air or gas is delivered to tank T without increasing its pressure above inlet pressure $P_1$, there is maximum power consumption and minimum efficiency.

Calculating the power consumption as "100" under such condition of minimum efficiency, said maximum power consumption of 100 is reduced according to the respective values of $Vc$ as follows, if $n=1.1$:

| Volume of $Vc$ in Cubic Inches | Percentage of Maximum Power Consumption |
| --- | --- |
| 50 | 59.0 |
| 80 | 68.5 |
| 100 | 70.0 |
| 150 | 73.5 |
| 200 | 80.5 |

The power consumption also increases, as the value of the coefficient $n$ is increased. Hence $n$ should approach 1 as closely as possible, by removing heat during the compression, to approach the ideal isothermal compression as closely as possible.

One function of the secondary rotors is to seal the outlet 16 from the intermediate space 10, or from the primary rotors, if said space 10 has zero volume. Hence the secondary rotors operate as valves.

If the pressure in the storage tank is gradually built up from $P_1$, for example, to a selected maximum tank pressure, the secondary rotors are driven continuously by the gas pressure which is created by the difference between input displacement and output displacement in space 10, as long as the pressure in the storage tank does not exceed the mixing pressure $Pc$.

When the pressure in the storage tank equals or is less than the mixing pressure $Pc$, mechanical driving force is required to operate the secondary rotors, and said driving force is provided by connecting the shaft 17 to a motor, and by the sprocket and chain connection previously stated. When the pressure in the tank exceeds the mixing pressure $Pc$, there will be a part of each cycle during which the pressure in space 10 will exceed the pressure in the storage tank. During such part of each cycle, the compressed gas or air in space 10 will supply motive power to the secondary rotors.

One of the great advantages of my invention is that all the pressure variations which result from the difference in the respective displacements, take place in advance of the outlet 16. Such pressure variations are wholly confined to the space 10. In any event, they do not take place at outlet 16, save for the pressure variation which occurs because $P_2$ exceeds the transient tank pressure. The pockets of compressed gas, which constitute volumes $V_2$, are discharged from the secondary pockets at constant pressure $P_2$ into the outlet 16. This advantage exists if the outlet 16 is the inlet of an atomizer or other device, instead of being the inlet of a storage tank. By rotating the rotors at high angular velocity, the respective volumes $V_2$ of compressed gas are discharged in a substantially uniform and constant current at substantially uniform velocity.

Since the rotors are operated at high velocity, the mixing of compressed gas with gas of the lower intake pressure takes place at high frequency, and therefore a change in timing of primary and secondary rotors has only a negligible effect upon the polytropic efficiency for a selected minimum volume $Vc$ of the space 10, and compressed gas continues to be discharged in a substantially uniform and constant current at substantially uniform velocity.

As an example, in using this embodiment according to the details above mentioned, the speed of rotation of the rotors may be 1,800 revolutions per minute. This corresponds to 10,800 discharges per minute, or 180 per second, in six-lobe rotors which are illustrated in this embodiment. The rotors may have any number of lobes.

The extent of compression of each new gas-volume $V_2$, before it is discharged from the outlet of the compressor, is stated in the following well-known equation.

$$(1) \quad \frac{HP \text{ pol.}}{HP_v \text{ constant}} = \frac{n}{n-1} \frac{\left(\frac{P_2}{P_1}\right)^{\frac{n-1}{n}}-1}{\left(\frac{P_2}{P_1}\right)-1}$$

$P_2$ is the absolute outlet or maximum pressure, in pounds per square inch.

$P_1$ is the absolute intake pressure, in pounds per square inch. Thus, if air at normal atmospheric pressure is drawn in, it has an absolute pressure of 14.7 pounds per square inch.

In the above, HP pol. designates the horsepower which is required for ideal polytropic compression, which is wholly isothermal; and $HP_v$ constant is the horsepower required for constant volume compression.

$$(2) \quad n = \frac{\log P_1 - \log P_2}{\log V_2 - \log V_1}$$

$V_2$ is the volume of the compressed gas in cubic feet, at pressure $P_2$.

$V_1$ is the volume of the drawn-in gas in cubic feet, at pressure $P_1$.

It is also well-known that for adiabatic compression, $n$ equals 1.4.

In such case, if it is assumed for example that $$(3) \quad \frac{P_2}{P_1} = 1.5$$

then, from Equation No. 1, by interpolation, $$(4) \quad \frac{HP \text{ adiab.}}{HP_v \text{ constant}} = \frac{.7}{1.0}$$

HP adiab. designates the horsepower required for a pure adiabatic compression.

In a polytropic compression, it is also well-known that $$(5) \quad V_2 = \frac{V_1}{\left(\frac{P_2}{P_1}\right)^{\frac{1}{n}}}$$

and $$(6) \quad T_2 = T_1 \left(\frac{P_2}{P_1}\right)^{\frac{n-1}{n}}$$

The temperatures stated in these equations are in the absolute or Kelvin scale.

$T_2$ refers to the outlet temperature of the charge of gas, and $T_1$ is its inlet temperature, so that $V_2$, $T_2$, $P_2$ correspond to each other, and $V_1$, $T_1$, $P_1$ correspond to each other.

The above-mentioned novel mixture step is utilized, whereupon there is secured a mixture pressure $Pc$ calculated as follows:

$$(7) \quad Pc = \left(\frac{P_1^{\frac{1}{n}} V_1 + P_2^{\frac{1}{n}} Vc}{V_1 + Vc}\right)^n$$

That is, in Equation 7, the volume $Vc$ is increased to $V_1$ plus $Vc$, at the end of the intermixing step.

The mixture temperature $Tc$ at pressure $Pc$, when volume $Vc$ is increased to $V_1$ plus $Vc$, can be calculated as follows:

$$(8) \quad Tc = T_1 \left(\frac{P_1}{Pc}\right)^{\frac{n-1}{n}}$$

and $$(9) \quad T_2 = Tc \left(\frac{P_2}{Pc}\right)^{\frac{n-1}{n}}$$

The intermixed gas volume, namely, $V_1$ plus $Vc$, having an initial pressure $Pc$ and an initial temperature $Tc$, is compressed to a final volume $V_2$ plus $Vc$, with a final pressure $P_2$ and a final temperature $T_2$, as follows:

$$(10) \quad \frac{V_1 + Vc}{V_2 + Vc} = \left(\frac{P_2}{Pc}\right)^{\frac{1}{n}}$$

$$(11) \quad \frac{T_2}{Tc} = \left(\frac{P_2}{Pc}\right)^{\frac{n-1}{n}}$$

The pressure in the compression space or chamber 10 is therefore increased from $Pc$ to $P_2$ as the tips of the respective lobes pass the intake and discharge ports of said space 10.

Figure 2:
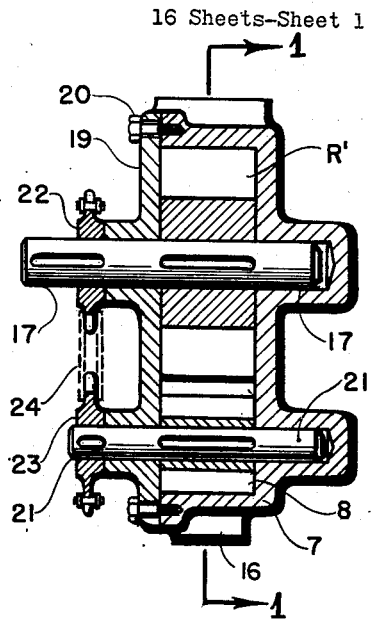
Fig. 2 is a section on the line 2—2 of Fig. 1.

A compression ratio of 5 to 1 or more is thus secured, with high efficiency, in the embodiment disclosed in Figs. 1 and 2.

As an example, if the apparatus is used to compress air at an absolute inlet pressure of 14.7 pounds per square inch, with a value of $n$ of 1.1, and a volume $Vc$ of 50 cubic inches, the mixing absolute pressure $Pc$ may be 29.9 pounds per square inch, and the absolute end pressure $P_2$ may be 73.5 pounds per square inch.

The principles stated herein apply to the other embodiments. As above noted, the gas may be discharged from outlet 16 into a storage tank which may be kept under constant pressure, which does not exceed $P_2$. In such case, the gas is not compressed by the secondary rotors.

*Second embodiment*

Figs. 3–6

One end of primary housing 33 is closed by cover 34, which has an inlet 35. Housing 33 is fixed to spacer 36 which is fixed to secondary housing 37. The end of housing 37 is closed by cover 38, which has an outlet 39.

The primary rotor 32 is keyed or otherwise fixed to the rotatable shaft 27. The primary rotor 32 is located in primary housing 33.

Secondary rotor 32 is fixed to shaft 27, so that rotors 32 and 26 rotate in unison. The width of primary rotor 32, measured along the longitudinal axis of shaft 27, exceeds the width of secondary rotor 26.

Primary rotor 32 is provided with four movable and primary vanes 28a, 29a, 30a, 31a.

The rotors may have any number of vanes.

Secondary rotor 26 has four movable and secondary vanes 28, 29, 30, 31.

The width of each vane equals the width of the respective rotor.

Each vane slides in a respective rotor-slot, which is inclined to the respective radial plane of the respective rotor.

Since a vane-type compressor per se is well-known, it is not necessary to describe its details.

Fig. 4 shows an angle A, which is less than 90° in this embodiment. It can be assumed that the apparatus is angularly divided into four quadrants, since each rotor has four vanes in this embodiment. The inlet 35 and outlet 39 are located in the first quadrant. The pocket of primary housing 33 which is located between primary vanes 30a and 31a in Fig. 4, is located in this first quadrant. The pocket of secondary housing 37 which is located between secondary vanes 29 and 30 in Fig. 6, is also in this first quadrant. These quadrants succeed each other counterclockwise, in this embodiment.

In the second quadrant, the inner wall of the primary housing 33 is concentric with the respective part of the primary rotor 32. The primary rotor 32 and the secondary rotor 26 are cylindrical and their peripheral cylindrical walls are concentric with the axis of rotation of shaft 27.

The space 10d in the third quadrant of the primary housing 33, which is located between primary vanes 28a and 29a in Fig. 4, is a part of the total space or chamber 10. In the fourth quadrant, there is a close turnable fit, with slight clearance, between the cylindrical wall of the primary rotor 32 and the respective part of the internal wall of primary housing 33.

In the second quadrant of the secondary housing 37, the cylindrical periphery of the secondary rotor 26 fits turnably closely, with slight clearance, against the respective part of the internal wall of the secondary housing 37. The third quadrant of the secondary housing has the space 10c, which is a part of the total space 10. In the fourth quadrant of the secondary housing 37, the cylindrical periphery of the secondary rotor 26 is concentric with and spaced from the respective part of the internal wall of the secondary housing 37. The spacer 36 has a bore 10b, which is a part of the total space 10, which consists of the respective spaces 10b, 10c, 10d. These spaces 10b, 10c, 10d, are axially alined at the completion of the end-compression stage which is shown in Figs. 4 and 6.

In the end-compression stage of Figs. 4 and 6, the second quadrant of the primary housing 33 has a volume $V_1$ of gas at pressure $P_1$. The space 10 then has its minimum volume $V_c$, and the respective components thereof, namely, the respective spaces 10d, 10b, and 10c, are axially alined and in communication. This space 10 contains gas or air at pressure $P_2$, in the end-compression stage of Figs. 4 and 6. There is substantially no gas or air in the third quadrant of primary housing 33, because of the small clearance between the respective parts of the walls of primary housing 33 and primary rotor 32.

The first quadrant of the primary housing 33 now communicates with inlet 35.

In said end-compression stage of Figs. 4 and 6, the first quadrant of the secondary housing 37 communicates with outlet 39.

There is substantially no gas or air in the second quadrant of secondary housing 37, due to the slight clearance between the respective parts of the walls of secondary rotor 26 and secondary housing 37.

The third quadrant of the secondary housing 37 contains air or gas at pressure $P_2$, at the end-compression stage.

The fourth quadrant of the secondary housing contains the volume $V_2$ at pressure $P_2$, at the end-compression stage.

When the rotors are turned slightly in advance of their end-compression positions of Figs. 4 and 6, the minimum volume $V_c$ of space 10 is enlarged to $V_1 + V_c$, and the same cycle occurs as in the first embodiment.

There is a phase difference of 180° between the primary rotor 32 and the secondary rotor 26. Hence the intake 35 of the primary rotor is located on the same side of shaft 27 as the outlet 39 of the secondary rotor.

The secondary rotor 26 acts as a valve rotor, like the secondary rotors 8 and 9 of the first embodiment.

*Third embodiment*

Figs. 7-9

This embodiment has two parallel and rotatable shafts 40 and 41, which are located in respective casings 48a and 48, which have identical internal, partial-cylindrical walls. Said internal walls meet at two parallel lines, so that the common cut-out of said internal walls is of uniform width.

Said shafts 40 and 41 are turned in respective reverse directions, as indicated by the arrows in Fig. 9, by means of the intermeshing timing gears 42 and 43, which are respectively fixed to shafts 40 and 41. In this embodiment, the pitch diameter of timing gear 43 is twice the pitch diameter of gear 42, so that shaft 41 is turned through an angle of 180 degrees, while shaft 40 is turned through a complete rotation of 360 degrees.

Helical rotors 40a and 41a are respectively fixed to shafts 40 and 41.

Helical rotor 40a has a cylindrical shank, which has a single primary helical rib 44, and a single secondary helical rib 50. The pitch of secondary rib 50 is less than the pitch of primary rib 44. Said ribs 44 and 50 are right-hand helical ribs, as viewed at the top of shaft 41.

Rotor 41a has a cylindrical shank which is provided with two parallel, left-hand, primary helical ribs 45a, and with two parallel, left-hand, secondary ribs 51a, as viewed at the top of shaft 41. Hence, rotor 41a is identical with a two-thread screw which has a cylindrical shank or body.

The pitch of the primary ribs 44 and 45a is identical. The smaller pitch of the secondary ribs 50 and 51a is identical.

The primary rib 44 and the two primary ribs 45a always intersect each other at the common cut-out of the internal part-cylindrical walls of the casings 48a and 48.

The outer walls of the primary rib 44 and of the secondary rib 50 are shaped to make sealing contact, with zero clearance or slight clearance, with the part-cylindrical internal wall of the casing 48a. The outer walls of the two primary ribs 45a and of the two secondary ribs 51a are similarly shaped, to make sealing contact with the internal, part-cylindrical wall of casing 48.

At the common cut-out of said identical part-cylindrical, internal walls, the ribs 44 and 50 make sealing contact with the cylindrical body or shank of rotor 41a, and the ribs 45a and 51a make sealing contact with the cylindrical body or shank of rotor 40a. In each case, such sealing contact may be with zero clearance or slight clearance.

The space between the cylindrical shank of rotor 40a and the internal, part-cylindrical wall of casing 48a, is thus divided into a plurality or series of primary pockets 44a and secondary pockets 50a.

Similarly, the space between the cylindrical shank of rotor 41a and the internal part-cylindrical wall of casing 48, is divided into two pluralities or series of primary pockets 45, and two pluralities or series of secondary pockets 51.

Each said set of primary and secondary pockets may include any number of pockets.

The bottom of casings 48a and 48 is provided with a common cover, which has an inlet 46. The top of casing 48a and 48 is provided with a common cover, which has an outlet 49.

If the internal wall of casing 48a were a complete cylinder, the ribs 44 and 50 would provide respective and continuous helical spaces between the cylindrical shank of rotor 40a and said complete, internal cylindrical wall. The ribs 45a and 51a always block said hypothetical, continuous, helical spaces, at the common cut-out.

Similarly, the ribs 44 and 50 always block the spaces between ribs 45a and ribs 51a at said common cut-out.

The rib 44 fits into the respective spaces between the parallel ribs 45a, and the rib 50 fits into the respective spaces between the parallel ribs 51a. Each rib 45a and 51a similarly fits into the respective spaces between ribs 44 and 50.

Each rib therefore exerts a piston-like action in the respective associated space to displace the air or gas upwardly, in a direction from inlet 46 to outlet 49.

The principle of operation remains unchanged, if rotor 41a is provided with a single primary rib 45a and with a single secondary rib 51a, and the principle of operation is explained, in connection with such apparatus, in which each rotor has a single primary rib and a single secondary rib.

Thus Fig. 7 shows that the single primary rib 44 has two complete helical turns, although it may have three or more complete helical turns. If rotor 41a has two primary ribs 45a, said ribs 45a, in the position of Fig. 7, will block the space between single primary rib 44 at a bottom blocking zone whose distance from the bottom point of rib 44 as it is shown in Fig. 7, measured along the vertical direction, equals one-half of the primary pitch of rib 44. The next blocking zone which is provided by rib 45 is then spaced 1.5 said primary pitch, from the bottom point of rib 44, as it is shown in Fig. 7.

The rib 44 will then similarly block the space between rib 45a. The bottom ends of the bottom primary pockets then communicate with inlet 46, and the top ends of the top primary pockets are then unobstructed, and communicate with outlet 49.

Assume that the shafts 40 and 41 are each turned respectively 360 degrees and 180 degrees from said positions shown in Fig. 7. At the end of said respective rotations, the bottom primary pockets will be blocked at their bottom ends, and the top primary pockets will be blocked at their top ends, since each primary helix of the apparatus has two sets of primary pockets for each 360 degrees of rotation of shaft 41. Said primary pockets are also blocked between their top and bottom ends, at a point which is spaced axially equally from their top and bottom ends, said axial space being equal to the primary pitch.

Viewed at their tops, the shaft 40 is turned clockwise, and the shaft 41 is turned counterclockwise, as indicated by the arrows in Fig. 9. By reason of this axial upward movement of the blocking zones, the input gas is displaced upwardly, without compression, in the spaces between the primary ribs of rotors 40a and 41a.

This upward displacement without compression, will occur during a predetermined period. During this predetermined period, the tops and bottoms of the primary pockets of the two-rib rotor 41a are both sealed, and the single-rib rotor 40a is turned through an angle of 360°, while said tops and bottoms of the primary pockets of single-rib rotor 40a also remain sealed.

The tops and bottoms of the primary pockets remain blocked, during a very short period.

The piston-like action in the secondary pockets is the same as in the primary pockets. The top of each primary pocket is always in communication with the bottom of the respective and axially alined secondary pocket, save during the short period in which the tops of the top primary pockets and the bottoms of the bottom secondary pockets are simultaneously blocked.

Hence, in this embodiment, the pressure is substantially gradually increased from $P_1$ to $P_2$ in the adjacent and communicating primary and secondary pockets, which are then sealed from the inlet and outlet. This follows from Equation No. 7, if it is assumed that $V_c$ is zero or substantially zero, as in this embodiment.

If rotor 41a has a single primary rib 45a and a single secondary rib 51a, the timing gears 42 and 43 have equal pitch diameters.

The purpose of providing rotor 41a with a plurality of primary ribs 45a and the same number of secondary ribs 51a, is to decrease the period of each cycle.

The principle of operation of this embodiment is the same as if two pistons are moved in the same direction in a cylinder, the rear piston being moved more rapidly than the front piston, so that the pressure of the gas between said pistons is gradually increased from $P_1$ to $P_2$, making allowance for the fact that $n$ is equal to one, only if the compression is an ideal isothermal compression.

The compression ratio is the ratio between primary pitch and secondary pitch, only if $n$ equals one.

Each pitch may be of any desired length.

Each bottom secondary pocket is always sealed from the next adjacent secondary pocket, and each top primary pocket is always sealed from the next adjacent primary pocket.

Each top primary pocket is always in communication with the respective bottom primary pocket, save during the very short interval of blocking of the adjacent ends of said pockets.

The direct superimposition of each bottom secondary pocket over the top primary pocket reduces the volume $V_c$ to zero, thus producing maximum thermal efficiency.

*Fourth embodiment*

Figs. 10 and 11

This shows a two-stage compressor. The first stage is identical with the embodiment of Fig. 1. The outlet 16 of the housing of the secondary rotors 8 and 9 of the first stage, is connected to the inlet end of a cooling pipe line 56, which has heat-radiating fins 56a. Said pipe line 56 can be artificially cooled by any suitable means.

The outlet end of pipe line 56 is connected to the inlet end 57 of the primary rotors 58 of the second compression stage. The second compression stage includes secondary rotors 59.

The second compression stage operates upon the same principle and in the same manner as the first compression stage.

All the rotors of the two stages are of the same width in this embodiment and they are rotated at the same angular velocity. The pitch diameter of rotors 58 is less than the pitch diameter of rotors 8 and 9, in order to allow for the reduction of volume and pressure which results from the cooling in pipe line 56.

*Fifth embodiment*

Figs. 12–19

This shows means for regulating the value of $V_c$ automatically, by means of the pressure in the storage tank. $V_c$ is thus diminished, as the pressure in the storage tank is increased.

This embodiment uses the lobe type rotors of the first embodiment.

Fig. 12 shows a main drive shaft 60 to which a gear 61 is fixed. Said gear 61 meshes with companion gears 62 and 63. The gear 62 is fixed to the shaft 17 of the primary rotor R', and the gear 63 is fixed to the shaft 21 of the secondary rotor 8. The primary rotor R' meshes with and drives the other primary rotor R''. The secondary rotor 8 meshes with and drives the other secondary rotor 9.

Fig. 16 shows the gas inlet 64 to the primary rotors. Fig. 18 shows the gas outlet 65 of the secondary rotors. Fig. 13 shows a partition 66, which has a through-and-through opening 67, which is optionally of non-cylindical or irregular shape, and which corresponds to part of the intermediate space 10. Said partition 66 divides the housing of the apparatus into two compartments which communicate through opening 67. The primary rotors R' and R'' are located in one of said compartments, and the secondary rotors 8 and 9 are located in the other of said compartments. The secondary rotors 8 and 9 are located between the partition 66 and a companion partition 68, which has a through-and-through opening 69, also optionally of irregular or non-cylindrical shape. As previously stated, Fig. 1 shows the positions of two lobes of the rotors R' and R'', just prior to the communication of two new pockets of uncompressed gas at pressure $P_1$ with the intermediate space 10.

In Fig. 13, the space or chamber which corresponds to the space 10 as it is shown in Fig. 1 consists of the sum of the volumes of the openings 67 and 69, plus the volume between the two respective teeth of the primary rotors and the volume between the two respective teeth of the secondary rotors, just prior to the beginning of the communication of two next pockets of uncompressed gas with said intermediate space. Hence Fig. 13 corresponds to Fig. 1. As shown in Fig. 19, the opening 69 is of general lenticular shape with a point at one end thereof. As shown in Fig. 16, the opening 67 has the shape of a double lobe.

Fig. 13 shows that the housing of the compressor is provided with a hollow extension in which a differential piston or plunger, which has respective piston sections 70 and 71, is slidably mounted. The cylindrical section 70 is of smaller diameter than the cylindrical section 71. A compression spring 72 outwardly biases this differential plunger. The piston section 71 of the plunger is slidable in a fixed cylinder 73, whose cap 75 is connected by means of the tank connection 74 to the storage tank in which the compressed gas is accumulated.

Fig. 13 also shows a space 76 between the end of the plunger 70—71 and said cap 75.

The piston section 70 slides in a fixed cylinder 77. The wall of this cylinder 77 is provided with a lateral annular port 78, which communicates by means of a passage 79, with the space 76. The inner wall of piston-section 70 is imperforate.

At the beginning of the delivery of compressed gas or air to the storage tank through the connection 74, the compression spring 72 maintains the head of the plunger 70—71, abutting the internal wall of the cap 75. The compressed air which enters the cylinder 77 through the opening 69, can then pass through the port 78 and the passage 79, through the recess 80 in the internal wall of cap 75, to the tank connection 74. Therefore a relatively large intermediate volume $V_c$ is provided at the beginning of the compression. The space between the inner closed end of the piston-section 70 and bore 69 is a part of the intermediate compression chamber 10. There is then a direct discharge of gas from the intermediate compression chamber into the tank, through the passage 79 and the tank connection 74. As the pressure in the tank is increased, the compression spring 72 is compressed by the pressure in the tank, and the differential piston 70—71 is moved towards the opening 69, until the port 78 is closed by piston-section 70, and this stops the passage of air from the outlet opening 69 of the compressor through passage 79 and connection 74 to the storage tank. Prior to the time that the supply of air to the storage tank through passage 79 is thus stopped, the volume of the intermediate compression space 10 is diminished, in proportion to the increase of air pressure. After the section 70 of the differential piston closes the annular port 78, the compressor discharges only through the outlet 65 which is always connected to the storage tank. A port of the outlet 65 is connected by means of the connection 74a to the previously mentioned tank connection 74. As the pressure in the tank is further increased by the entry of compressed gas, only through the discharge outlet 65 and pipe 74a, the differential piston 70—71 is finally moved to the extreme inner position shown in Fig. 13, in which it closes the opening or port 69, thus gradually reducing the volume of the intermediate compression chamber 10 to a minimum, namely, $V_c$.

*Sixth embodiment*

Figs. 20 and 21

The embodiment of Figs. 20 and 21 uses the vane type of apparatus which is shown in Figs. 3–6. In the embodiment of Figs. 20 and 21, a change of speed ratio between the primary and secondary rotors is utilized in order to secure an adjustable compression ratio, in proportion to the change in pressure in the storage tank or other receiver.

Any type of mechanism for securing an adjustable speed ratio can be used.

Fig. 20 shows the primary rotor 32 fixed to a shaft 81, which is coaxial with a shaft 82, to which the secondary or valve rotor 26 is fixed. The shaft 81 is connected by means of the sprocket 83, chain 84 and sprocket 85, to the jack-shaft 86, to which the frusto-conical friction wheel 87 is fixed. Said frusto-conical friction wheel 87 is in frictional contact with a companion frusto-conical frictional wheel 88, which is mounted upon the rotary and longitudinally slidable shaft 89. This shaft 89 is slidable in the direction of its longitudinal axis. Said friction wheel 88 contacts with a frusto-conical friction wheel 90 which is fixed to the shaft 82 of the secondary rotor 26. The secondary or valve rotor 82 is provided with an outlet 91 to the storage tank or the like, and the primary rotor 32 is provided with a gas intake 92. A port of the gas outlet 91 is connected by means of the pipe 93 to the cap or head 94 of the cylinder 95, in which the piston 96 is slidable. The compression spring 97 biases the piston 96 towards the cap 94. At the beginning of the supply of compressed gas to the storage tank, the piston 96 abuts the cap 94, thus providing a maximum speed ratio between the friction wheels 87 and 90 through the intermediate friction wheel 88, and thus driving the secondary or valve rotor 26 at a maximum number of revolutions per minute. Therefore, at the very beginning of the operation, the secondary rotor 26 delivers substantially uncompressed gas to the storage tank. As the pressure in the storage tank is built up, the piston 96 is forced inwardly by said pressure, thus causing the valve rotor 26 to be driven at progressively lower speed, and thus increasing the compression ratio of the air which is supplied to the tank receiver.

When the maximum selected pressure is reached, the primary and secondary rotors are revolved at relative speeds which produce the desired ultimate compression ratio.

When automatic regulation is provided for, the control member can optionally be operated by hand, and be held fixed in any desired adjusted position.

*Seventh embodiment*

Figs. 22, 22A and 23

In this embodiment, the ratio between input displacement and output displacement is secured by primary rotors and secondary rotors of respective different widths. The pitch diameters of the four rotors are the same. Any means can thus be used, in any embodiment, for regulating the ratio between input displacement and output displacement.

In this embodiment, respective pairs of timing gears are used to drive rotors R'' from shaft 17, and to drive rotor 9 from shaft 21. These respective timing gears of shafts 17 and 21 are designated by the reference numerals 98 and 99.

Drive pulley 101 is fixed to shaft 17. Drive pulley 101 is connected by V-belts 103 to driven pulley 102, which turns freely on shaft 21. Said driven pulley 102 has a jaw clutch-end 104 in this embodiment. The companion jaw-clutch member 100 is slidable on shaft 21. Jaw-clutch member 100 turns in unison with shaft 21. Jaw-clutch member 100 is in a ring housing which has outwardly extending pins 104a which fit in the respective notches of a fork 105. Fork 105 is pivoted at 106 to the fixed frame F of the device.

Rod 108 is pivotally connected at 107 to fork 105. Rod 108 is connected to piston 109, which slides in a cylinder, in which compression spring 110 biases piston 109 to its extreme inner position which is shown in Fig. 22.

At its inner end, said cylinder of piston 109 communicates with a passage 111, which is connected to outlet 16.

When the pressure in the storage tank is equal to $P_1$, piston 109 is in its initial position of Fig. 22, and the clutch is disconnected, and the secondary rotors are driven solely by the gas pressure which is created in the intermediate chamber 10.

At the beginning of the building up of pressure in tank T, the tank pressure is the same as the inlet pressure $P_1$.

During the first part of the building up of pressure in tank T, while the tank pressure is less than the selected maximum tank pressure, the clutch remains uncoupled and non-operative, and the secondary rotors are driven wholly "free-wheeling," by the pressure developed in space 10. The angular velocity of the secondary rotors is thus automatically adjusted to the maximum pressure transiently existing in the tank. This automatically varies the ratio between input displacement and output displacement, thus automatically regulating the compression ratio in space 10 and regulating pressure $P_2$.

A selected intermediate stage will be reached, in which further "free-wheeling" drive is to be superseded by a positive mechanical drive of the secondary rotors. When the selected intermediate stage is reached, the tank pressure in the tank will operate piston 109 to couple the clutch, so that during further compression and further delivery of compressed gas to tank T, the clutch will remain coupled.

When the clutch is coupled, the compression ratio and pressure $P_2$ will remain fixed and it will be dependent upon the relative angular speeds of pulleys 101 and 102, and the relative widths of the primary pockets and secondary pockets.

Fig. 23 shows the jaw-clutch manually regulated by lever L.

The clutch may be of any type, mechanical, electromagnetic, etc.

*Eighth embodiment*

Figs. 24–31B

In this embodiment, the primary and secondary rotors are of the internal lobe or gear type, to be used as the rotors of a reversible expansion motor.

Figs. 28 and 29 show an outer housing 115 which is the frame of the motor. A valve housing 121 and a power housing 118 are located internally of said outer housing 115. Said housings 121 and 118 are turned in unison relative to the housing 115, in order to select the direction of rotation of the shaft 107. For this purpose, and as shown in Fig. 28, said housings 121 and 118 are connected by one or more connecting members 122. As shown for example in Fig. 28, the outer housing 115 is provided with an internal annular rib 115a. The housings 121 and 118 have respective transverse flanges which substantially abut said annular rib 115a with negligible clearance. As shown for example in Fig. 28, the valve housing 121 has an internal extension 110. This extension 110 has an arc of substantially 90°, in this embodiment.

As shown for example in Fig. 28, the power housing 118 also has an internal extension 118a. The arc or angle of the extension 118a is also substantially 90°, in this embodiment.

Upon comparing Fig. 25 and Fig. 27, it is clear that the respective extensions 118a and 110 are angularly spaced substantially 180°.

In this embodiment, the rotors are of the lobe type, and in each set of rotors, one of said rotors has external lobes or teeth, and the other has internal lobes or teeth.

Fig. 27 shows the smaller valve rotor 109 which has the external lobes or teeth, and the larger valve rotor 109a, which has the internal lobes or teeth.

The smaller valve rotor 109 is fixed to the shaft 107, and its respective pitch circles and root circles are concentric with the longitudinal axis of rotation of the shaft 107. The axis of rotation of the internal lobe valve-rotor 109a is shown at 107a in Fig. 27. The outer periphery of the internal tooth valve rotor 109a is cylindrical, and this outer periphery is turnably mounted in an anti-friction bearing 121B of the valve housing 121.

In Fig. 31A, the point 107a is shown below the axis of rotation 200 of the shaft 107, merely to explain the theory of operation.

The angles 209 and 210 between the lines 207 and 208, which pass through the axis of rotation 200, define the respective angles of the respective gas ports for the valve rotors. One of said gas ports serves as an inlet port or as an outlet port, depending upon the selected direction of rotation of the shaft 107. When one of said gas ports serves as an inlet port, the other gas port serves as an outlet port.

Assuming as an example, that the angle 209 defines the inlet port, and that the angle 210 defines the outlet port, the shaft 107 will be turned clockwise, as viewed in Fig. 31A. In Fig. 31A, it is clear that if gas under pressure is admitted to the port which is defined by the angle 209, said gas will exert a clockwise torque upon both valve rotors 109 and 109a, when they are in the respective positions shown in Fig. 31A. If gas under pressure is thus admitted to said port defined by angle 209, the gas will always exert a clockwise driving torque upon the two valve rotors. On the other hand, if the valve housing 121 is turned 180° from its position of Fig. 31A around axis 200, and gas under pressure is admitted to the port defined by the angle 210, the shaft 107 will be rotated counterclockwise in unison with the two valve rotors 109 and 109a, as said shaft is viewed in Fig. 31A. When valve housing 121 and its extension 110 are thus shifted, axis 107a is also shifted 180° relative to axis 200.

Fig. 31A shows that the two valve rotors 109 and 109a have unequal numbers of teeth. In this specific embodiment, the smaller valve rotor 109 has five lobes or teeth, and the larger valve rotor 109a has seven internal teeth.

Fig. 31A shows the station at which one external lobe meshes with a respective internal lobe, with substantially zero clearance. Such meshing seals the pockets of the internal lobes from the pockets of the external lobes, thus securing the same result which is shown in Fig. 1. The external lobes and the internal lobes respectively form sealed pockets with the inner and outer walls of the extension 110.

The smaller external lobe rotor 109 is designated as the driving valve rotor because it is keyed or otherwise fixed to the shaft 107.

This description of the valve rotors 109 and 109a applies generally to the two power rotors 108 and 108a. The smaller power rotor 108 has external lobes and it is keyed to the shaft 107, and its axis of rotation is concentric with the axis 200 of the shaft 107.

The larger power rotor 108a has internal lobes and its axis of rotation is defined by the point 108b. It is noted that the respective points 107a of Fig. 27 and 108b of Fig. 25 are spaced 180° apart. These external and internal lobes of the power rotors also form respective sealed pockets with the internal and external walls of the extension 118a of the power housing 118. Likewise, the external and internal lobes of the power rotors intermesh at only one mating zone, so that the previous description applies. The smaller power rotor 108 which has the external lobes, is designated as a driving power rotor because it is keyed to the shaft 107. The cylindrical periphery of the larger power rotor 108a is mounted in an anti-friction bearing 118c of the power housing 118.

The valve housing 121 is provided with an end cover 122a, and the power housing 118 is provided with an end cover 120. The end cover 122a of the valve housing 121 is provided with respective inlet ports 130 and 126. The cover 120 of the power housing 118 is provided with respective outlet ports 133 and 129.

The valve rotors 109 and 109a are provided with respective outlet passages 127 and 131. The power rotors 108 and 108a have inlet ports or passages 128 and 132. The ports or passages 133 and 129 serve as outlet ports for the power rotors.

Te passage 121a serves to connect the respective outlet port of the valve rotor to the respective inlet port of the power rotor. The volume of the passage 121a plus the volumes of the respective inlet and outlet ports which are operative at the time, is equivalent to the space 10 of the first embodiment.

The cover 122a of the valve housing 121 has an extension 123 to which the hand wheel H is fixed, suitable stops being provided in the fixed housing 115, so as to limit the turning movement of the hand wheel H as well as of the valve housing 121 and the power housing 118, to 180°.

The outer housing 115 is provided with respective end covers 116 and 117 which have a respective inlet 112 and a respective outlet 113. Cover 116 has a passage 125.

When the respective ports are in the positions of Figs. 24-29 inclusive, the shaft 107 is rotated counterclockwise, as viewed in Figs. 28 and 29, as indicated by the arrows in Figs. 28 and 29.

Air at pressure $P_2$ enters the inlet 112. At this time, the port 126 is the inlet port for the valve rotors, the port 127 is the outlet port for the valve rotors, the port 128 is the inlet port for the power rotors, and the port 129 is the outlet port for the power rotors.

Air under pressure $P_2$ will therefore exert driving torque upon the valve rotors by means of their respective external and internal lobes which then contact with the respective walls of the segment 110.

As previously explained in connection with the first embodiment, the pressure in the space 121 varies from the outlet pressure $P_1$ to a mixing pressure which is substantially $P_c$.

The air which enters the power rotors will exert torques upon their respective lobes which are in contact with the external and internal walls of the segment 118a.

The power rotors will deliver successive pockets of air or gas, at the outlet pressure $P_1$, to the port 129, and through the outlet 113. In order to reverse the direction of rotation of the shaft 107, the valve housing 121 and the power housing 118 are turned 180° relative to the housing 115, from the positions of such housings 121 and 118 which are shown in Figs. 24-29 inclusive. This new position of the turnable housings is shown in Figs. 30 and 31.

In such new position, inlet passage 112 communicates with the port 130, which is now the inlet port for the valve rotors. The outlet port for the valve rotors is now the port 131, because said port 131 now registers with the space 121. The port 132 now registers with said space 121, so that the port 132 is now the inlet port for the power rotors. The port 133 now registers with the outlet passage 113, so that the said port 133 is now the outlet port for the power rotors.

Due to the difference in the number of teeth between the rotors of each set, the larger internal lobe rotor will rotate at lower angular velocity than the respective smaller external lobe rotor.

The ratios of these respective angular velocities is the inverse of the ratio of the respective numbers of lobes. The external pockets of the external lobe rotor are proportional with respect to the internal pockets of the internal lobe rotors, so that each rotor receives and discharges the same volume of gas.

As in all expansion motors, the parts of such motors are rapidly cooled, so that unless external heat is applied, the value of $n$ will approach 1.4.

*Ninth embodiment*

Figs. 32-38

This shows a vane-type apparatus, shown as a compressor. It can be used as a motor.

In this embodiment, the secondary housing 130 is a resilient one-piece ring, so that volume $V_2$ is adjustable, without changing the minimum clearance which is shown in the second quadrant of Fig. 6. This is a marked advantage over previous designs of variable volume vane-type apparatus. In the second of the six sectors of this embodiment, the outer wall of the resilient housing 130 fits against the inner wall of the outer rigid housing 131.

Hence, when the resilient housing 130 is deformed by being subjected to pressure by plunger 131a, the minimum volume $V_2$ is changed, without changing $V_c$.

The primary rotor is designated by the numeral 134, and the secondary rotor is designated by the numeral 135. The housing 131 has inlet 133 and outlet 136. This embodiment is the same in principle and in operation as the second embodiment, save for the regulation of $V_2$.

In Fig. 38, the plunger 131a is manually operated by hand-wheel H, whose shaft has a screw-end 140, which engages the tapped wall of a recess of plunger 131a.

In Figs. 32-37, plunger 131a is connected to piston 141, which is biased by compression spring 142, to the position of Figs. 35 and 36.

The discharge pocket of the housing of the secondary vane rotor is connected by passage 143 and pipe 144 to the outer end of cylinder 145.

As the outlet pressure, as in the storage tank or elsewhere, is increased, the plunger 131a is moved inwardly to decrease $V_2$, thus increasing the compression ratio of the apparatus, as required by the transient outlet pressure.

While the drawings are to scale, the scale is not the same in all the figures.

All the embodiments have the following common characteristics in changing the pressure of gas, either by expansion or compression:

A gas is moved through a selected path, which has an inlet end, an outlet end, and a pressure-changing zone which is located intermediate said ends. The gas is supplied to said inlet end at an inlet or input pressure, and it is expelled from said outlet end, at an outlet or output pressure. Said inlet and outlet pressures may be fixed or they may be varied. At the outlet end, the outlet pressure optionally is at least equal to the external pressure at said outlet end. Optionally, the outlet pressure is greater than the respective external pressure at said outlet end. Said external pressure may be the pressure in a storage tank.

The gas is supplied to the pressure-changing zone in a succession of respective input volumes or input pockets, and it is removed from said pressure-changing zone in a succession of output volumes or output pockets.

Optionally at least one input volume or pocket which is sealed from said inlet end and also from said pressure-changing zone, is always maintained between the inlet and the pressure-changing zone.

At least one sealing wall is always maintained between the inlet end and the pressure-changing zone, and at least one other sealing wall is maintained between said pressure-changing zone and said outlet end. This sealing wall may be a vane or a wall of the lobe rotor, or the like.

Optionally, one or a plurality of sealed pockets are always located between said pressure-changing zone and said ends of the path.

Each pocket or each sealing wall is displaced in a rotary path relative to a reference line.

Thus in the embodiment of Fig. 3, each sealed pocket has a rotary movement, in addition to a longitudinal movement.

The entire change in pressure from input pressure to output pressure, optionally takes place in the pressure-changing zone, and the output pockets are preferably at the same outlet pressure, and the input pockets are preferably at the same input pressure, as long as the input pressure remains fixed.

The successive output pockets or charges are expelled with sufficient continuity, so as to deliver an output current of gas which is of substantially uniform density and velocity, as long as the input pressure remains fixed.

The above characteristics apply to the compression and expansion of a gas.

In compressing a gas, $n$ may have any value, although it is preferred to approach isothermal compression as closely as possible, and to approach isothermal expansion as closely as possible in operating a motor. That is, during compression, cooling means can be used, and during expansion, any external source of heat can be used.

The difference between inlet pressure and outlet pressure is regulated by the difference between input volume and outlet volume.

In the embodiments in which the value of $V_c$ exceeds zero, the invention is not limited to any particular relation of $V_c$ to $V_1$. However it is preferred that the maximum value of $V_c$ should be 200 per cent of $V_1$, because thermal efficiency decreases very rapidly with further increase of $V_c$.

It is noted that apparatus is provided which has a set of secondary rotors in which the output displacement is varied, for the purpose of changing the compression ratio, so as to discharge gas at different respective final pressures from the outlet of the secondary rotors. This change in output displacement is accomplished, either by changing the speed ratio between the primary and secondary rotors which deliver respective constant volumes per revolution, or by changing the volume per revolution which is delivered by the secondary rotors.

In the various embodiments, the rotor means are provided with recesses, such as the recesses which are provided by the lobes in the first embodiment, the recesses which are provided by vanes in the second embodiment, the recesses which are the helices in the third embodiment, etc.

One of the important features of this invention is that one of the rotor means is driven by the other, solely by gas which is delivered by one rotor means to the other. Thus, in the case of a compressor, one rotor means is driven by an engine, and it delivers gas which rotates the other rotor means. In the case of a motor, one rotor means is actuated by compressed gas from a storage tank or the like, and it actuates the other rotor means, solely by the expansion of delivered gas.

In the reversible fluid motor of the seventh embodiment, the internal lobe rotors are not claimed to have been originated, because the same are well known per se. In the combination illustrated, such internal lobe rotors permit a very compact construction, but an important feature of the reversible motor is the provision of two concentric and relative turnable housings, irrespective of the rotor means per se.

In the reversible fluid motor specifically illustrated, a pair of rotors has been disclosed in each inner housing, one rotor of each pair being fixed to the motor shaft 107. One rotor in the housing 121 is driven by the gas which enters the main inlet port 112 of the main housing. However, it is clear that the gas which passes into the interior of the motor through main inlet port 112 can drive the respective adjacent rotor means by "free-wheeling," as disclosed in another embodiment.

In this embodiment, as in other embodiments, the outer or main housing 115 has an expansion space or chamber between the axially alined first housing 121 and second housing 118. The input air is discharged at input pressure, in the form of successive volumes, into this expansion space, by the first rotor means in said first housing 121. The expanding air actuates the second rotor means in the second housing 118. The air is expanded to substantially output pressure in said expansion space. The expanded air, at substantially output pressure, is delivered to the main outlet port, in the form of a succession of volumes.

Each housing 121 and 118 has two pairs of housing ports. Either pair of housing ports can be alined with the main inlet port and the main outlet port of the main housing 115, thus selecting the direction of rotation of the motor shaft.

What is claimed is:

1. A method of changing the pressure of a gas from an input pressure to an increasing output pressure, which consists in introducing the gas at inlet pressure into the inlet end of a selected path which has an outlet end and a pressure-changing zone between said ends, feeding the gas between said inlet end and said pressure-changing zone in a succession of input volumes at input pressure, feeding the gas between said pressure-changing zone and said outlet end in a succession of output volumes at output pressure, said inlet end being always sealed from said pressure-changing zone and said pressure-changing zone being always sealed from said outlet end, the change in pressure being confined to said pressure-changing zone, the total input displacement of said successive input volumes being different from the total output displacement of said successive output volumes, due to said change in pressure in said pressure-changing zone, the ratio between inlet pressure and outlet pressure being in proportion to the inverse ratio between input displacement and outlet displacement, said pressure-changing zone having a minimum volume which is increased temporarily to temporarily decrease the pressure therein when an input volume is fed into said pressure-changing zone, said increased volume being changed to said minimum volume in order to compress the gas in said pressure-changing zone to the output pressure, and gradually diminishing said minimum volume as said output pressure is increased.

2. A method according to claim 1, in which each respective volume is moved in a rotary path about a selected axis.

3. A method according to claim 1, in which the output pressure is maintained at least equal to the external pressure at said outlet end.

4. A method according to claim 1, in which each respective volume is moved in a rotary path about a selected axis, and the output pressure is maintained at least equal to the external pressure at said outlet end.

5. A method according to claim 1, in which the change in pressure in the pressure-changing zone is produced in a series of cycles, the gas in the pressure-changing zone being at the output pressure at the end of each cycle, the pressure changing zone being placed in communication with the next adjacent respective input volume at the beginning of each cycle to produce a mixing pressure in said pressure-changing zone which is between the input pressure and the output pressure, said pressure-changing zone being sealed from the next adjacent respective output volume until substantially at the end of a respective cycle, a new respective output volume at output pressure being formed during each cycle, said pressure-changing zone being a pressure-changing space which is located between the next adjacent respective input and output volumes.

6. Apparatus which comprises primary and secondary rotor means which are arranged in series, said primary rotor means being located in a primary housing, said secondary rotor means being located in a secondary housing, the primary housing having an inlet, the secondary housing having an outlet, said housings being in communication with each other at their inner ends, said primary housing and said primary rotor means being shaped always to provide at least one sealing wall between said inlet of said primary housing and its inner end, said secondary housing and said secondary rotor means being shaped always to provide at least one sealing wall between said outlet of said secondary housing and its inner end, said primary rotor means being shaped to draw in input displacement gas through said inlet end in succession of primary pockets which are delivered from said inner end of said primary housing to said inner end of said secondary housing, said secondary rotor means being shaped to discharge said indrawn gas as output displacement gas through said outlet end in a succession of secondary pockets, a drive shaft connected to said primary rotor means, and speed-change means connecting said secondary rotor means to said drive shaft.

7. Apparatus which comprises an inlet casing and an outlet casing, said inlet casing having an inlet port, said outlet casing having an outlet port, inlet and outlet rotor means located respectively in said inlet casing and in said outlet casing, said inlet and outlet rotor means being connected to rotate in unison, said inlet rotor means having inlet rotor recesses and said outlet rotor means having outlet rotor recesses, said inlet rotor recesses being successively alined with and successively communicating with said inlet port and said outlet rotor recesses being successively alined with and successively communicating with said outlet port when said rotor means are rotated in unison, said casings being shaped to communicate with each other at a location between their respective ports, said casings and said rotor means being shaped always to seal said inlet port and said outlet port from said location, said rotors being shaped so that their respective pockets communicate with each other at said location through a space whose volume is varied between a respective minimum volume and a respective maximum volume by the rotation of said rotor means in a series of cycles and movable means independent of said rotors for regulating said minimum volume.

8. Apparatus according to claim 7, in which said volume is varied in each cycle to produce a pressure which is between inlet and outlet pressure at the beginning of each cycle and which is the outlet pressure at the end of each cycle.

9. Apparatus for handling a gas, said apparatus comprising an inlet casing and an outlet casing, said inlet casing having an inlet port, said outlet casing having an outlet port, said casings having an intermediate communicating port, inlet rotor means located in said inlet casing, outlet rotor means located in said outlet casing, said inlet rotor means having inlet rotor recesses, said outlet rotor means having outlet rotor recesses, said inlet rotor recesses being successively alined with and successively communicating with said inlet port during the rotation of said inlet rotor means, said outlet rotor means being successively alined with and successively communicating with said outlet port during the rotation of said outlet rotor means, said casings and said rotor means being shaped so that respective pockets communicate with each other at said intermediate port, a chamber connected to said outlet port, said chamber having a chamber-port, said chamber having movable volume-regulating means located therein and adapted to vary the volume of the space in said chamber through which gas flows between said outlet port and said chamber port.

10. Apparatus according to claim 7, in which said outlet port is connected to a storage tank and said space is connected to said storage tank, and pressure-responsive means operated by the pressure in said storage tank to regulate the maximum volume of said space, said maximum volume being decreased as said pressure is increasd.

11. Apparatus which comprises an inlet casing and an outlet casing, said inlet casing having an inlet port, said outlet casing having an outlet port, inlet and outlet rotor means located respectively in said inlet casing and in said outlet casing, said inlet and outlet rotor means being connected to rotate in unison, said inlet rotor means having inlet rotor recesses and said outlet rotor means having outlet rotor recesses, said inlet rotor recesses being successively alined with and successively communicating with said inlet port and said outlet rotor recesses being successively alined with and successively communicating with said outlet port when said rotor means are rotated in unison, said casings being shaped to communicate with each other at a location between their respective ports, said casings and said rotor means being shaped always to seal said inlet port and said outlet port from said location, said rotors being shaped so that their respective pockets communicate with each other at said location through a space whose volume is varied by the rotation of said rotor means in a series of cycles, said rotor means being connected to each other by variable speed-ratio connecting means, said outlet being connected to a storage tank, and pressure-responsive means operated by the pressure in said tank to regulate the speed-ratio of said connecting means.

12. Apparatus which comprises an inlet casing and an outlet casing, said inlet casing having an inlet port, said outlet casing having an outlet port, inlet and outlet rotor means located respectively in said inlet casing and in said outlet casing, said inlet and outlet rotor means being connected to rotate in unison, said inlet rotor means having inlet rotor recesses and said outlet rotor means having outlet rotor recesses, said inlet rotor recesses being successively alined with and successively communicating with said inlet port and said outlet rotor recesses being successively alined with and successively communicating with said outlet port when said rotor means are rotated in unison, said casings being shaped to communicate with each other at a location between their respective ports, said casings and said rotor means being shaped always to seal said inlet port and said outlet port from said location, said rotors being shaped so that their respective pockets communicate with each other at said location through a space whose volume is varied by the rotation of said rotor means in a series of cycles, said rotor means being connectable to each other by releasable and closable clutch means, said outlet being connected to a storage tank, and pressure-responsive means operated by the pressure in said storage tank to close said clutch means when said pressure reaches a predetermined minimum.

13. Apparatus which comprises an inlet casing and an outlet casing, said inlet casing having an inlet port, said outlet casing having an outlet port, inlet and outlet rotor means located respectively in said inlet casing and in said outlet casing, one of said rotor means being power-driven, the other of said rotor means being mechanically disconnected from said power-driven means and being rotatable wholly by gas delivered thereto by said power-driven means, said inlet rotor means having inlet rotor recesses and said outlet rotor means having outlet rotor recesses, said inlet rotor recesses being successively alined with and successively communicating with said inlet port and said outlet rotor recesses being successively alined with and successively communicating with said outlet port, said casings being shaped to communicate with each other at a location between their respective ports, said casings and said rotor means being shaped always to seal said inlet port and said outlet port from said location, said rotors being shaped so that their respective pockets communicate with each other at said location through a space whose volume is varied by the rotation of said rotor means in a series of cycles.

14. A method of operating a rotor from which gas is discharged at output pressure, which consists in feeding gas toward said rotor in a succession of respective input pockets under input pressure discharging the gas successively from said input pockets anterior said rotor, into a space which is located anterior said rotor, changing said input pressure in said space in a series of successive cycles, first to an intermediate pressure which is between input pressure and output pressure and finally to output pressure, supplying said gas from said space to said rotor in a series of successive pockets which are discharged from said rotor at output pressure, and exerting rotary force on said rotor in said space by the change in said space from input pressure to output pressure, and rotating said rotor wholly by said rotary force.

15. A method according to claim 14, in which the relation between input pressure and output pressure is regulated by the load on said rotor.

16. Apparatus which comprises a rigid hollow housing which has an inner wall, a flexible and one-piece resilient ring located and held in said housing, the ends of said ring abutting and being closed by end-walls of said rigid housing, a pressure member movably connected to said rigid housing and extending through said inner wall of said housing and having a concave pressure face which abuts and interfits with a part of the outer face of said ring, said pressure member holding an opposed part of said ring abutting a part of the inner wall of said housing, the outer wall of said ring being spaced from the inner wall of said rigid housing in two zones between said pressure member and said opposed and abutting part of said ring, said outer wall of said ring being also inwardly spaced at said pressure member from said inner wall of said housing, said pressure member being shaped to seal said two zones from each other, a rotor located inwardly of the inner wall of said ring and rotatable about a selected axis, the periphery of said rotor being unevenly spaced from the inner wall of said ring, said rotor having slidable vanes located in respective slots of said rotor, said vanes abutting the inner wall of said ring and said end-walls and dividing the space between said rotor and the inner wall of said ring into a plurality of respective pockets of respective unequal volume, said housing having an inlet port which communicates with one of said pockets, said housing having an outlet port which communicates with another of said pockets, the radius of curvature of the entire inner wall at every point thereof of said ring being positive relative to the axis of rotation of said rotor.

17. Apparatus according to claim 16, in which said pressure member is fixed at said concave face to said ring.

18. A reversible expansion motor comprising a main housing and a first housing and a second housing, the first housing and the second housing being located within the main housing, a rotatable motor shaft, said three housings being concentric relative to the longitudinal axis of rotation of said motor shaft, said first and second housings being longitudinally alined, the motor shaft passing through said first and second housings, said main housing having a main inlet port and a main outlet port and an expansion space between said first and second housings, first rotor means located in said first housing, second rotor means located in said second housing, each said first and second housing having two pairs of housing ports, said first and second housings being connected to each other to turn in unison relative to said main housing into either of two selected positions, a selected pair of the ports of said first and second housings being respectively alined with said main inlet port and said main outlet port and said expansion space in each of said selected positions, said first housing and its respective rotor means being shaped and constructed to be driven by the entering gas at input pressure to deliver the input gas to said expansion space in a series of successive volumes at input pressure which is finally lowered in said expansion space to substantially output pressure in order to expand the gas in said expansion space, said expanding gas actuating the respective rotor means in the second housing, said respective rotor means of the second housing being connected to said motor shaft to drive the same, said second housing and its respective rotor means being constructed and shaped to deliver the gas at substantially output pressure to said main outlet port in a series of consecutive volumes, the direction of rotation of the rotor means in said first and second housings being governed by the selection of the pairs of housing ports which are alined with said main inlet port and said main outlet port and said expansion space.

References Cited in the file of this patent

UNITED STATES PATENTS

| Number | Name | Date |
|---|---|---|
| 763,525 | Van Beresteyn | June 28, 1904 |
| 903,036 | Westerlund et al. | Nov. 3, 1908 |
| 1,029,309 | Miles | June 11, 1912 |
| 1,214,300 | Grouvelle et al. | Jan. 30, 1917 |
| 1,218,300 | Nelson | Mar. 6, 1917 |
| 1,390,829 | Smoot | Sept. 13, 1921 |
| 1,457,696 | Ford | June 5, 1923 |
| 1,773,211 | Wilsey | Aug. 19, 1930 |
| 2,150,122 | Kollberg et al. | Mar. 7, 1939 |
| 2,159,748 | Miller et al. | May 23, 1939 |
| 2,215,512 | Kucher | Sept. 24, 1940 |
| 2,369,539 | Delamere | Feb. 13, 1945 |